(12) United States Patent
Diep

(10) Patent No.: US 12,183,220 B2
(45) Date of Patent: Dec. 31, 2024

(54) ELECTRONIC VISUALLY-ASSISTED DRIVER COMMUNICATION SYSTEM

(71) Applicant: Minh Quang Diep, Port St. Lucie, FL (US)

(72) Inventor: Minh Quang Diep, Port St. Lucie, FL (US)

( * ) Notice: Subject to any disclaimer, the term of this patent is extended or adjusted under 35 U.S.C. 154(b) by 0 days.

(21) Appl. No.: 18/597,116

(22) Filed: Mar. 6, 2024

(65) Prior Publication Data
US 2024/0249652 A1    Jul. 25, 2024

Related U.S. Application Data

(63) Continuation-in-part of application No. 17/879,486, filed on Aug. 2, 2022, now Pat. No. 11,993,206.

(51) Int. Cl.
| | |
|---|---|
| G09F 21/04 | (2006.01) |
| G09F 9/302 | (2006.01) |
| G09F 27/00 | (2006.01) |
| G09G 3/20 | (2006.01) |

(52) U.S. Cl.
CPC .......... *G09F 21/048* (2013.01); *G09F 9/3023* (2013.01); *G09F 27/007* (2013.01); *G09G 3/2092* (2013.01); *G09G 2380/06* (2013.01)

(58) Field of Classification Search
CPC .... G09F 21/048; G09F 9/3023; G09F 27/007; G09G 3/2092; G09G 2380/06
See application file for complete search history.

(56) References Cited

U.S. PATENT DOCUMENTS

| | | | | |
|---|---|---|---|---|
| 5,905,434 A | * | 5/1999 | Steffan | B60Q 1/545 116/28 R |
| 6,812,851 B1 | * | 11/2004 | Dukach | G09F 21/042 345/212 |
| 2005/0134441 A1 | * | 6/2005 | Somuah | B60Q 1/5035 340/435 |
| 2005/0273232 A1 | * | 12/2005 | Hill | B60Q 1/545 701/1 |
| 2012/0098652 A1 | * | 4/2012 | Varella | B60Q 1/503 340/425.5 |
| 2019/0286414 A1 | * | 9/2019 | Langos | B60Q 1/547 |
| 2023/0099464 A1 | * | 3/2023 | Nguyen | G08G 1/096855 340/463 |

* cited by examiner

*Primary Examiner* — Daryl C Pope
(74) *Attorney, Agent, or Firm* — Origins Law, LLC; Nicholas Spatola

(57) ABSTRACT

The invention provides an innovative electronic driver courtesy system designed to improve road communication. The system includes a driver courtesy housing with an emissive display, power source, control module, and communication module, all attached to a vehicle for external visibility. It also involves an electronic device for user operation, featuring a screen with a graphical interface, microphone, processor, memory, and communication module for data transmission with the driver courtesy housing. Key features include voice commands or user interface engagement for sending textual messages, displayed on the vehicle's emissive display. This system enables drivers to convey specific messages to other road users, enhancing communication clarity and road safety. The invention overcomes limitations of traditional driver communication methods and modern distractions. It integrates smartphone technology with vehicle display systems to offer a safer communication method on roads.

20 Claims, 24 Drawing Sheets

ELECTRONIC VISUALLY-ASSISTED DRIVER COMMUNICATION SYSTEM

CROSS-REFERENCE TO RELATED APPLICATIONS

This application is a Continuation-in-Part of co-pending U.S. Non-Provisional patent application Ser. No. 18/424,825, entitled "AN ELECTRONIC VISUALLY-ASSISTED DRIVER COMMUNICATION SYSTEM", FILED Jan. 28, 2024. This application is also a Continuation-in-Part of co-pending U.S. Non-Provisional application Ser. No. 17/879,486, entitled "DRIVER COURTESY", filed Aug. 2, 2022, now granted as U.S. Pat. No. 11,993,206, all of which are hereby incorporated by reference in their entireties for all purposes.

FIELD OF THE INVENTION

The present invention relates to a driver curtesy and, more particularly, to a driver curtesy that can display messages by a wireless connection to an external device which may be controlled by voice or user interaction.

BACKGROUND

In the modern age, communication between drivers on the road has been limited to rudimentary signals. Traditional methods include the use of hand gestures, flashing of headlights, or sounding the horn. While these methods are commonly recognized, they often lack specificity in the message being conveyed and can sometimes lead to misunderstandings between drivers.

Moreover, in recent years, there has been a significant increase in the use of smartphones and other portable electronic devices. Many drivers have adopted the use of these devices for navigation, entertainment, and communication purposes while driving. However, this usage often leads to distracted driving, which has been identified as a major cause of road accidents.

Various solutions have been proposed in the past to improve communication between vehicles. For instance, electronic billboards placed on the back of trucks displaying messages or advertisements. Some vehicles have also come equipped with message displays, but these are typically limited to predefined messages or symbols, like "baby on board" or "student driver".

Furthermore, there have been developments in voice recognition and speech-to-text technologies. Several smartphone applications and in-car systems enable drivers to send text messages, make phone calls, or navigate without physically interacting with their device. This hands-free approach is designed to reduce distractions and improve road safety. However, these solutions often keep the communication confined to the device or the car's occupants, without an effective way to relay specific messages to other road users.

In light of the aforementioned, there is a need for a more advanced and versatile system that allows for real-time, specific communication between drivers, while also reducing the need for direct interaction with handheld electronic devices.

SUMMARY OF THE INVENTION

The invention disclosed herein provides an electronic driver courtesy system. The electronic driver courtesy system comprises a driver courtesy housing, wherein the driver courtesy housing is coupled to a vehicle and positioned to be viewable to an outside audience. The driver courtesy housing containing at least an emissive display, a power source, a control module coupled to the emissive display, and at least one communication module coupled to the control module. The electronic driver courtesy system also comprises an electronic device for user operation, the electronic device having a screen displaying a graphic user interface, at least one microphone, a processor, a memory, and at least one communication module capable of selectively pairing with the communication module in the driver courtesy housing, whereby the communication module of the electronic device for user operation includes a means for transmitting and receiving data packets to and from the communication module coupled to the control module of the driver courtesy housing, and the communication module of the driver courtesy housing includes a means for transmitting and receiving data packets to and from the electronic device for user operation.

The invention disclosed herein provides an additional embodiment of the electronic driver courtesy system. This second embodiment includes a driver courtesy housing, wherein the driver courtesy housing is coupled to a vehicle and positioned to be viewable to an outside audience. The driver courtesy housing containing at least an emissive display, a power source, a control module coupled to the emissive display, and at least one communication module coupled to the control module. The system further includes an electronic device for user operation, the electronic device having a screen displaying a graphic user interface, at least one microphone, a processor, a memory, and at least one communication module capable of selectively pairing with the at least one communication module in the driver courtesy housing, whereby the at least one communication module of the electronic device for user operation includes a means for transmitting and receiving data packets to and from the at least one communication module coupled to the control module of the driver courtesy housing, and the at least one communication module of the driver courtesy housing includes a means for transmitting and receiving data packets to and from the electronic device for user operation.

The memory of the electronic device for user operation includes at least one program stored thereon that, when executed by the processor, performs the steps of: initiating a connection between the at least one communication module of the electronic device for user operation and the at least one communication module in the driver courtesy housing, and receiving an input. The input is at least one of: (i) a voice command by the at least one microphone of the electronic device for user operation, wherein the voice command includes a message to be displayed as a textual message on the emissive display of the driver courtesy housing, (ii) an input received through user engagement of the graphic user interface of the screen of the electronic device for user operation, wherein the input received through user engagement of the graphic user interface of the screen includes a typed message to be displayed as a textual message on the emissive display of the driver courtesy housing, or (iii) an input received through user engagement of the graphic user interface of the screen of the electronic device for user operation, wherein the input received through user engagement of the graphic user interface of the screen includes a selection of one pre-programmed message in a list of pre-programmed messages to be displayed as a textual message on the emissive display of the driver courtesy housing. The steps also include displaying a received textual message to be displayed on the emissive display of the driver courtesy housing on the screen of the electronic device for user operation, transmitting a data packet containing the received textual message to be displayed on the emissive display of the driver courtesy housing to the at least one communication module coupled to the control module of the driver courtesy housing, receiving the data packet containing the received textual message to be displayed on the emissive display by the at least one communication module coupled to the control module of the driver courtesy housing, processing the data packet containing the received textual message to be displayed on the emissive display of the driver courtesy housing is processed by the control module, displaying on the emissive display of the driver courtesy housing, the received textual message, received from the electronic device for user operation, and removing the received textual message from the emissive display upon receiving a communication prompting removal of the received textual message from the emissive display.

It is an object of the present invention to reduce road accidents by providing a clear and specific means of communication between drivers, thereby avoiding misunderstandings that can occur with traditional signals like hand gestures or horn honking.

It is yet another object of the present invention is to integrate advanced technology into vehicles for communication purposes, effectively bridging the gap between conventional road signals and the digital age.

It is a further object of the present invention is to address the limitations present in the state of the art. This invention aims to provide a system that allows drivers to convey textual messages to other road users easily and safely. Through the combination of smartphone integration and display technology, drivers can communicate more specific messages, thereby promoting clearer communication and potentially improving road safety. In summary, the present invention seeks to bridge the gap between modern communication technology and traditional vehicle communication, offering a novel solution to a longstanding issue on the roads.

The drawings and specific descriptions of the drawings, as well as any specific or alternative embodiments discussed, are intended to be read in conjunction with the entirety of this disclosure. The invention may be embodied in many different forms and should not be construed as being limited to the embodiments set forth herein; rather, these embodiments are provided by way of illustration only and so that this disclosure will be thorough, complete and fully convey understanding to those skilled in the art. The above and yet other objects and advantages of the present invention will become apparent from the hereinafter set forth Brief Description of the Drawings, Detailed Description of the Invention, and Claims appended herewith.

DETAILED DESCRIPTION OF THE INVENTION

Figure 1:
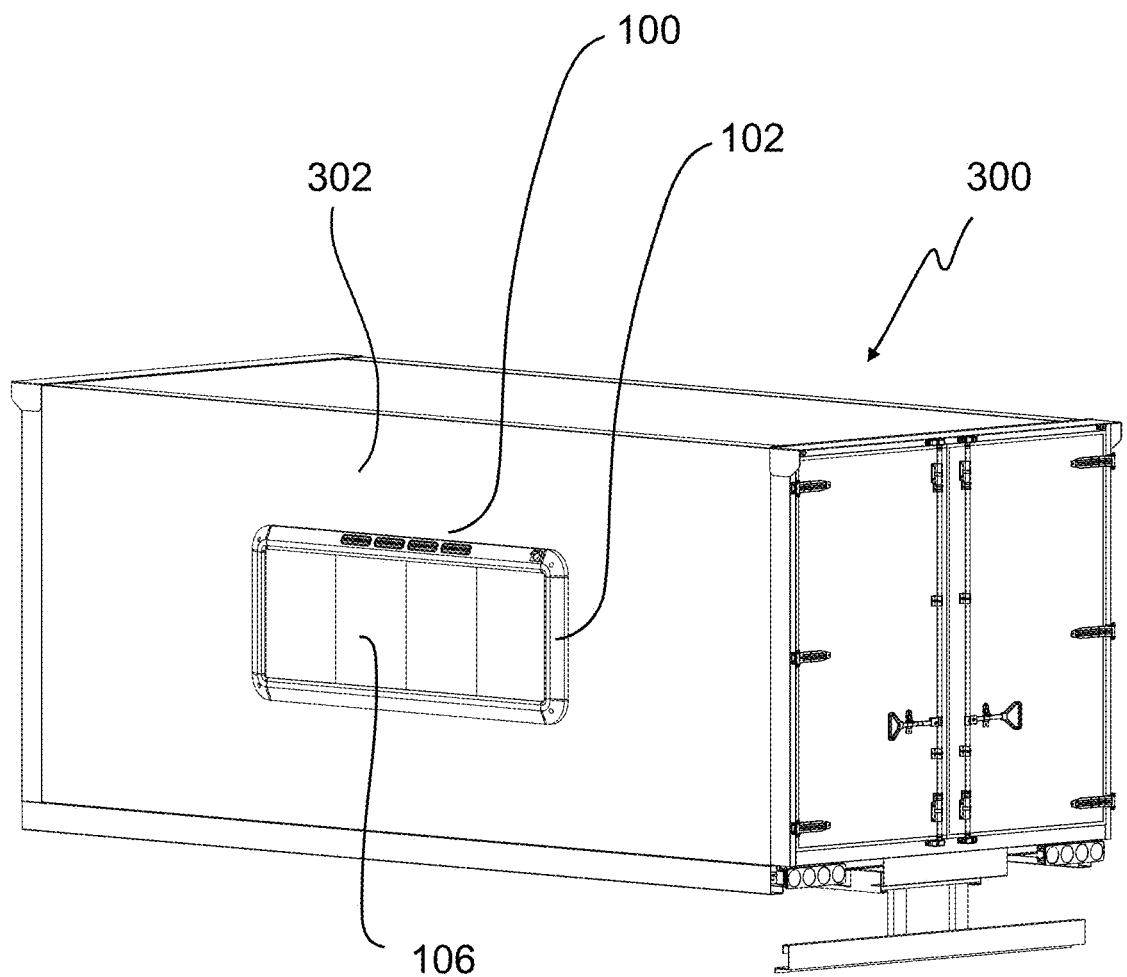
FIG. 1 illustrates an isometric view of a trailer having a driver communication system attached thereto.

The invention herein provides a solution for lack of visual communication systems between drivers. The invention includes a uniquely configured emissive display integrated into or onto a vehicle with speech to text, text to text, and pre-loaded messages capable of solving the above issues.

As discussed above, road rage has become an alarming issue on roadways, resulting in aggressive behaviors and potential dangers for all motorists. Misunderstandings and communication breakdowns between drivers often escalate into tense confrontations, leading to accidents, and unnecessary conflicts. The lack of reliable means to effectively communicate and address concerns exacerbates the problem, leaving drivers feeling frustrated and powerless. This pressing problem calls for an innovative solution that promotes understanding, empathy, and courteous interactions among drivers, ultimately mitigating road rage incidents and fostering a safer driving environment for everyone involved.

The current invention solves these problems by providing a driver courtesy; a hands off and voice actuated messaging and advertising display. The solution offers a groundbreaking approach to tackle the issue of road rage and promote safer roads. By introducing a large screen mounted on the side or back of a vehicle, accompanied by a dedicated software application on a user's mobile device, the system empowers drivers to engage in positive and meaningful communication with other drivers. This unique platform allows drivers to convey important messages, warnings, or expressions of appreciation, bridging the gap in communication and fostering a culture of courtesy on the roads. Through this innovative technology, drivers can take control of the road in a responsible and constructive manner, reducing misunderstandings and promoting a harmonious driving experience. By giving drivers the means to communicate effectively, the Driver's Courtesy system creates a powerful tool for enhancing road safety and cultivates a more considerate and respectful driving community.

The definition of Driver Courtesy describes a level of conscious and awareness among all drivers, a sense of courtesy, consideration, generosity, and patience towards one another. Ultimately, the act of Driver Courtesy will help improve awareness, safety, and help diffuse road hazards and road rage situations.

Driver Courtesy is a mechanical, electrical, and software interface device that will display messages on a screen to other drivers. The driver using the software interface of this device can command the messages from voice to text, typed text input to text, and selection of default pre-scripted messages to display the messages to other drivers on the road.

The Driver Courtesy comprises three essential parts. The mechanical components include various mechanical parts put together as a screen display. This screen may be mounted on any moving vehicle on the road, including, but not limited to, semi-trucks, commercial trailers, recreational vehicles, campers, box trucks, passenger vehicles, busses, and domestic vehicles of any kind. The mechanical device may be manufactured in various sizes customized to ft any of the above-mentioned moving vehicles as noted above. This mechanical implementation will entail a: screen display, borders and frames, solar panels, rechargeable battery integrated with a charging plug that is compatible with conventional electrical outlets for charging, camera and camera software, a two-way listening device, speaker, and accompanying listen and speak software, and an impact sensor.

The complete assembled mechanical unit may be installed into the above vehicles and trailers in several ways. Namely, for trucks and trailers this unit may be mounted on the outside to the body or to the rear of the unit where it is most useful from a positional perspective. The same installation method may be applied to campers and recreational vehicles. For domestic vehicles, such as passenger vehicles, cars, and trucks, an additional screen or monitor may be engineered to replace the loss of view where the mechanical part was installed. Also, the app feature has a monitor option where the driver can use his or her electronic device, such as a smart phone, as a way of viewing the loss of view.

The electrical components of this device play a key role by providing an electrical display of messages through various styles of front, size, color combinations, writing script, electrical movement speed, and display. This device also includes a camera and a two-way listening and speaking device and software which enables the driver to have an active view from the camera, to listen to outside sound and also have the ability to send voice communication outside of the device. Additionally, the device may come with a sensor feature that will activate the camera feature to start taking snapshots at predetermined level of impact towards the unit or where it is mounted. When this happens, the camera will initiate live recording, including snapshots when the impact initiated, and will be stored in the device's memory. This electrical feature may also be used as a source of advertising, and an advertising component, where it is displayed. This is in addition to the text style messages illustrating the sender's voice commands.

Further, the electrical components may include a Wi-Fi module, Bluetooth module, and/or cellular module for compatibility between a user's smart phone and the communication module of the device. The screen display is typically configured to have a visibility from 100-feet away. The live camera and sound interface allow the user to listen and speak to subjects in front of the display. The system is capable of receiving voice commands, text input, selection of default script options, and displaying these inputs as textual communications on the display.

The software interface also plays a critical role in how the system communicates to the general public. The software is built to the device itself, as well as available for a user's smart phone to form a complete system. The software defines an app designed for the driver to make his or her communication demands, listening for voice commands, or receiving textual input, or receiving a selection of a pre-written message. These messages are then displayed on the screen as a source of communication to the other drivers. The software functionality also includes multiple languages, including English and Spanish with additional languages if required. A filter will be applied to prevent any profanity or blacklisted messages from being displayed.

Consistent with prior versions of the disclosed invention, the system generally includes a frame assembly, an electronic system assembly, and an electric assembly.

In external applications, the frame assembly may include a frame a front portion, a back portion an attaching portion, an attachment adapter, and a vehicle. The frame may be suitable to be made of an aluminum material with natural rubber allowing a waterproof frame when raining. In some installations, the frame may be made of a steel, carbon fiber, or any other suitable variation. The frame may be located to a lateral side of a vehicle allowing to provide a vision for the other vehicles. The frame may be assembled by the front portion and the back portion which may have a hollow body that stores the electronic system assembly and the electric system assembly. The front portion and the back portion may be made of a material from which the frame may be made of. The front portion and the back portion may be interlocked by each side thereof.

In some installations, the front portion may have the electronic system assembly attached to the surface thereof to allow the frame display messages. The frame may include an attachment adapter which is placed in a rear portion thereof considering the back portion. The attachment adapter may be in a rear central portion of the frame to provide stability when attaching to the side of the vehicle. The attachment adapter may have a rectangular body that allows inserting any type of screws to lock the frame to a side of a vehicle. It may be considered that the attachment adapter may be configured to allow the frame to be attached to any commercial trailer, movie trailer, fuel trailer, vehicle, bus, passenger vehicle, recreational vehicle, or any other variation thereof considering passing through highways or street where the frame can be seen by other motorist in the vicinity. The attachment adapter may be suitable to be made of a steel material to provide resistance when collocating the frame in a surface of a vehicle.

The frame may include a plurality of attaching portions which are located in a rear portion of the frame in various points in the rear surface of the frame to allow attaching the frame in a side of the vehicle. The attaching portions may be made of a magnetic material. It is to be considered that attaching portions may be made of a ferromagnetic metal which allows the frame to interlock a surface. The attaching portion and the attachment member may be configured to attach the frame to the lateral side of the vehicle or any exterior sides. the attachment member and the attaching portions may be configured to attach the frame to any vehicle considering different variations which may modify shape thereof according to the type of vehicle the frame is being attached to. The attachment member may be configured to be customized for any vehicle which may modify the different embodiments regarding the shapes thereof.

In internal installations, the frame is positioned inside of a vehicle window, such as behind the windshield or rear window, whereby the display is positioned to show through the respective window for outside viewers to view. This may be useful for ridesharing applications to notify riders of an approaching vehicle, and may also be useful for general communication between drivers when configured to a rear window of the vehicle.

The electronic system assembly includes an electronic system, a display, and a remote device. The frame is dimensioned to receive the electronic system, the remote device and the electric system. The electronic system may include a control module, such as a microcontroller, and a display. In some installations a GPS may also be included. The electronic system may pass through the front portion to show the display when activating the frame by the remote device. The electronic system may activate the GPS unit to allow the frame to be traceable. It is to be considered that the electronic system may be configured to display different colors that show different signals. For example, the display may show the messages with red/white lights to prevent warnings, emergencies, or medical alerts, may show the messages with a green light for general expressions, greetings/alerts or any variation thereof, or may show the messages with an amber light for roadside assistance requests, weather, traffic condition, forecast and alerts.

The electronic system may be controlled by a user's electronic device which may be controlled by voice, or touch input, to provide the display of messages over the frame. It is to be considered that electronic system may be configured to cooperate with the electric system assembly to properly function. The messages may be configured to prevent any accident by providing signal or message to other vehicles. The messages may show warning messages, emergency messages, assistance messages, expression messages, informative messages, or any other variation thereof.

The electric system assembly may include an electric system, a battery, and inputs. The electric system may include a battery which may be configured to power the electronic system. The battery may be a rechargeable battery or may be required to be plugged in to the vehicle's power system. It is to be considered that the frame may be required to be charged when collocating on a trailer/vehicle. The frame may provide signal messages to avoid/prevent accidents or in any situation needed.

In some embodiments, driver courtesy is a device comprised of three distinct areas, one of which mechanical, one of which electrical, and one of which provides software interface functionality. The software is a critical function of this device. Some embodiments of driver courtesy included, at least, the following features: Bluetooth capability, voice to text, text to text, text by default and software, interface, pre-selected options, video camera with recording, motion/proximity sensor.

In some embodiments, the product includes a broad spectrum of functionality. With regard to voice to text message, the driver will utilize Bluetooth on his or her Phone device to transmit data to an electronic board. The electronic board then transcribes the text onto display. The user speaks his voice to text, and/or sending emoji symbol.

In some embodiments, an additional option from the software functionality includes a pre-recorded messages and expressions, which can be from pre-scripted default messages and display massages, which a driver may initiate by simply clicking on the selected default message, and that message will automatically be sent to the messaging board. The driver also has the option to text from a cellular phone device, which may also automatically send to the electronic board as text scripts.

In some embodiments, the driver courtesy device may also have a video camera feature that would enable the driver to view, take snapshots, and record.

In some embodiments, the driver courtesy device also includes a proximity sensor to keep away unwanted physical tampering.

In some embodiments, the driver courtesy device has a tracking feature with the driver location in real time in real place, and may include additional features such as speed measurement, acceleration measurement, application of a hard stop on the vehicle's brakes, and time on idle.

In some embodiments, the driver courtesy also has electronic features with regard to entertainment software. This electronic feature will allow the driver to change screens from regular messaging mode into live television mode, with cloud, Wi-Fi and surround sound capability as well.

Another main feature of the software incorporated into some embodiments of the software is a digital advertising platform. In some embodiments, this feature will provide critical functionality of the driver courtesy. With respect to this digital advertising capability.

Driver courtesy software administrative staff will have complete backend control of the features of the system. Administrative staff will design, upload, update, and manage logistical functionality of the software. Each digital advertisement can be created, showing either a still image or a video file with 10 to 30 second of playtime. Still frame advertisements will play for approximately 10 to 12 seconds and then rotate to the next ad. Following the final advertisement, the board will loop from the beginning. Files may be played for approximately 10 to 30 second depending on user input, or advertisement patron preferences. Messaging can also be integrated into playtime of the digital advertising. Advertisement size can be created in various versions, sizes, and styles. It is entirely up to the patron's preferences with regard to advertising demands. If the patron requests advertising modifications and updates, additional configuration and integration into the pre-existing advertising campaign can be done.

In some embodiments, the driver courtesy system includes message alerts with regard to traffic signals, driver alerts, expressions, construction alerts, warnings, and hazard alerts. Important alerts will take precedence over the advertising campaign while the advertising campaign is running. Once the alert is complete, the advertising and messaging resumes. Traffic message and/or alerts may display between 5 to 20 seconds in length. This feature will only be used if and when it is necessary and/or in an emergency situation. In non-emergency situations, digital advertising will take the priority with regard to board playtime.

In some embodiments, the system is capable of integrating transmissions from the National Broadcast Emergency Alert System, thereby using the driver courtesy as a messaging board. In these embodiments, the driver courtesy technology also has the capability of picking up satellite signals, radio frequencies, cellular data for cloud communications, Wi-Fi, and/or any other applicable frequency with regard to broadcasting messages. Driver courtesy may engage in national alert and emergency broadcast systems, which will help in dispatching national emergency messages from cities, states, and nationally to make the general public aware with regard to any weather, disaster, hazardous road conditions, and/or child safety alerts.

In an exemplary implementation, a city from any particular state may have a national weather alert that needs to make notice to the general public, and may send a radio signal or satellite communication to any one of the driver courtesy devices, and be able to broadcast the messages to the general public.

This technology also has the capability of picking up any satellite, radio frequency, showing real-time messages broadcasting to the general public, simultaneously, and continuously. This emergency broadcast signal will take precedence over any advertising campaign while the device is on. The digital advertising campaign will resume once emergency messages are completed or no longer broadcasting.

The electronic visually-assisted driver communication system of the present invention may be used to reduce road accidents by providing a clear and specific means of communication between drivers, thereby avoiding misunderstandings that can occur with traditional signals like hand gestures or horn honking. The electronic visually-assisted driver communication system of the present invention may also be used to integrate advanced technology into vehicles for communication purposes, effectively bridging the gap between conventional road signals and the digital age. This apparatus and system are particularly shown in FIGS. 1-28.

Figure 2:
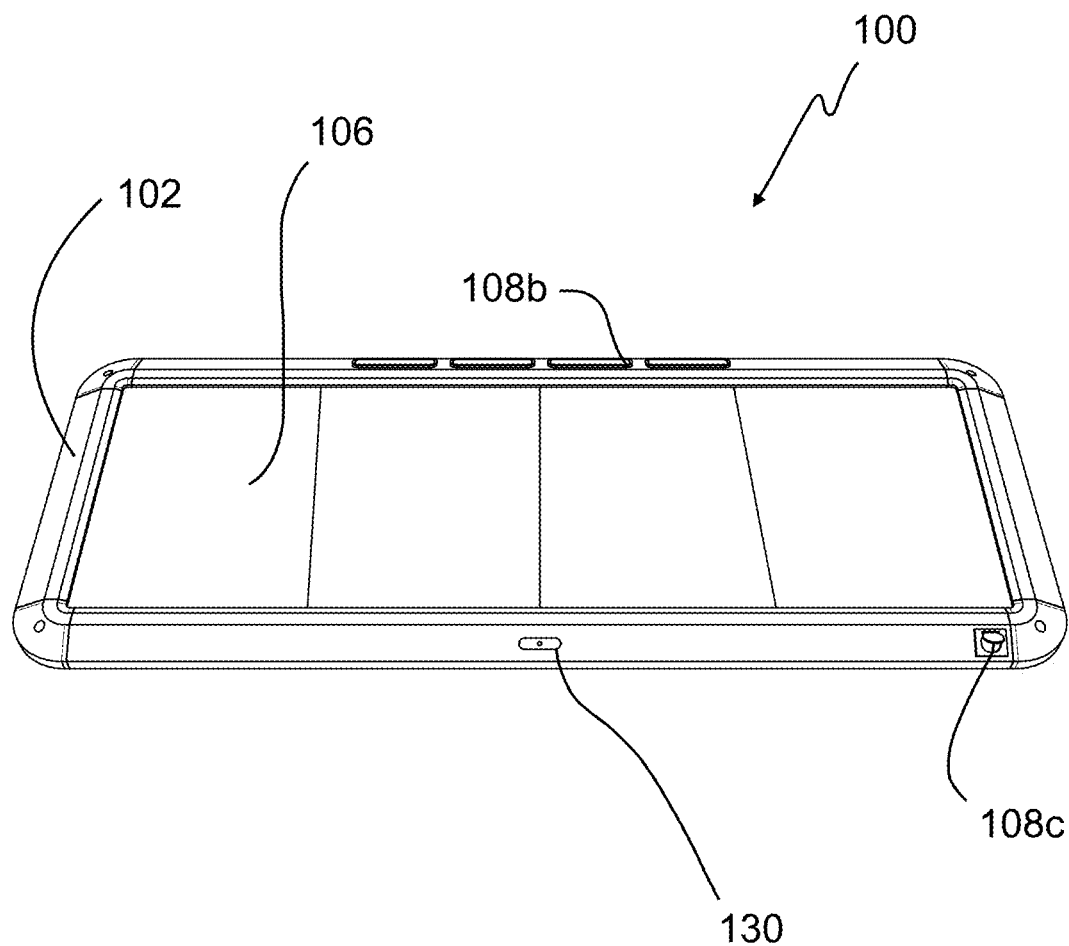
FIG. 2 illustrates a bottom-front isometric view of the driver communication system.
Figure 3:
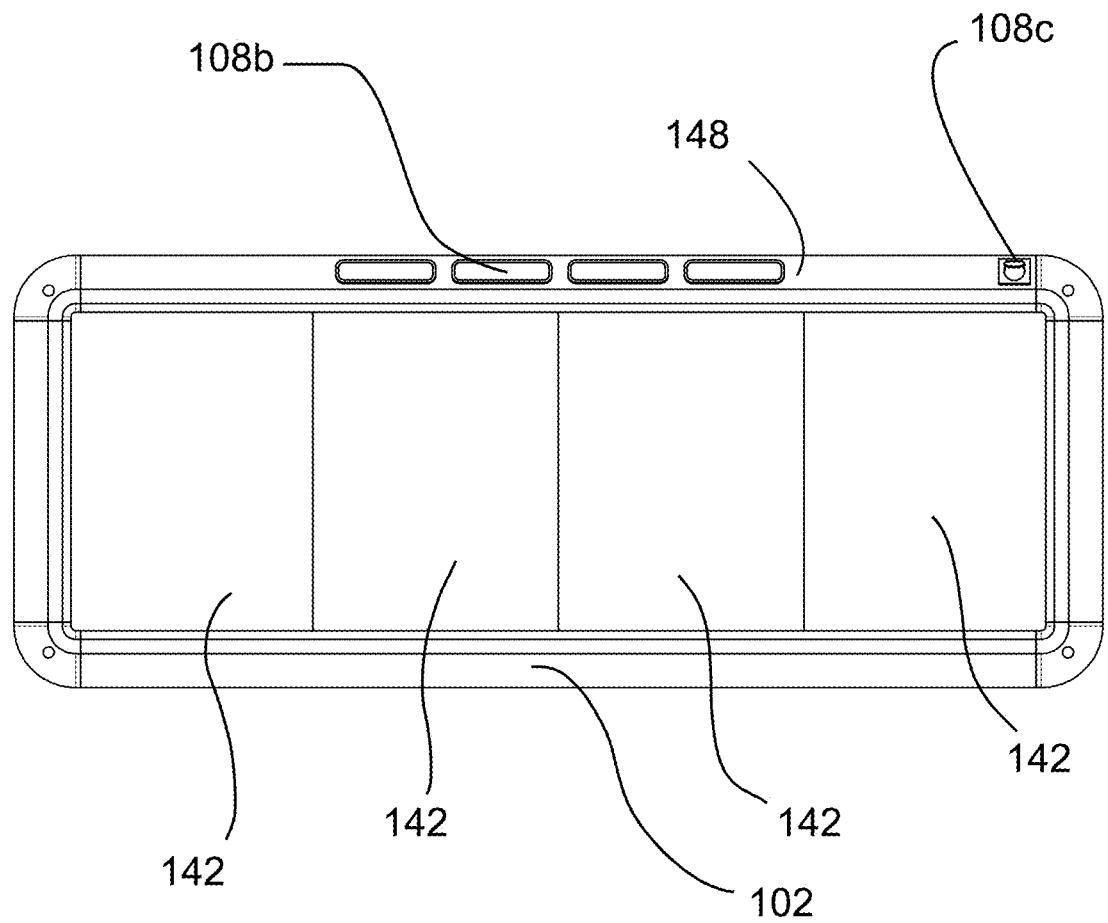
FIG. 3 illustrates a front view of the driver communication system.
Figure 4:
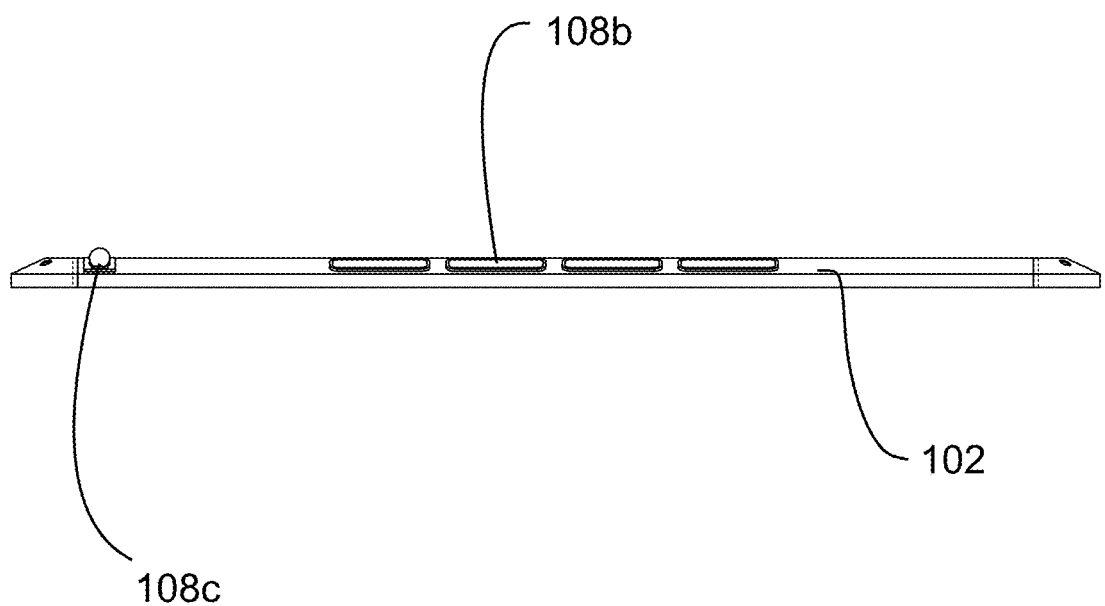
FIG. 4 illustrates top view of the driver communication system.
Figure 5:
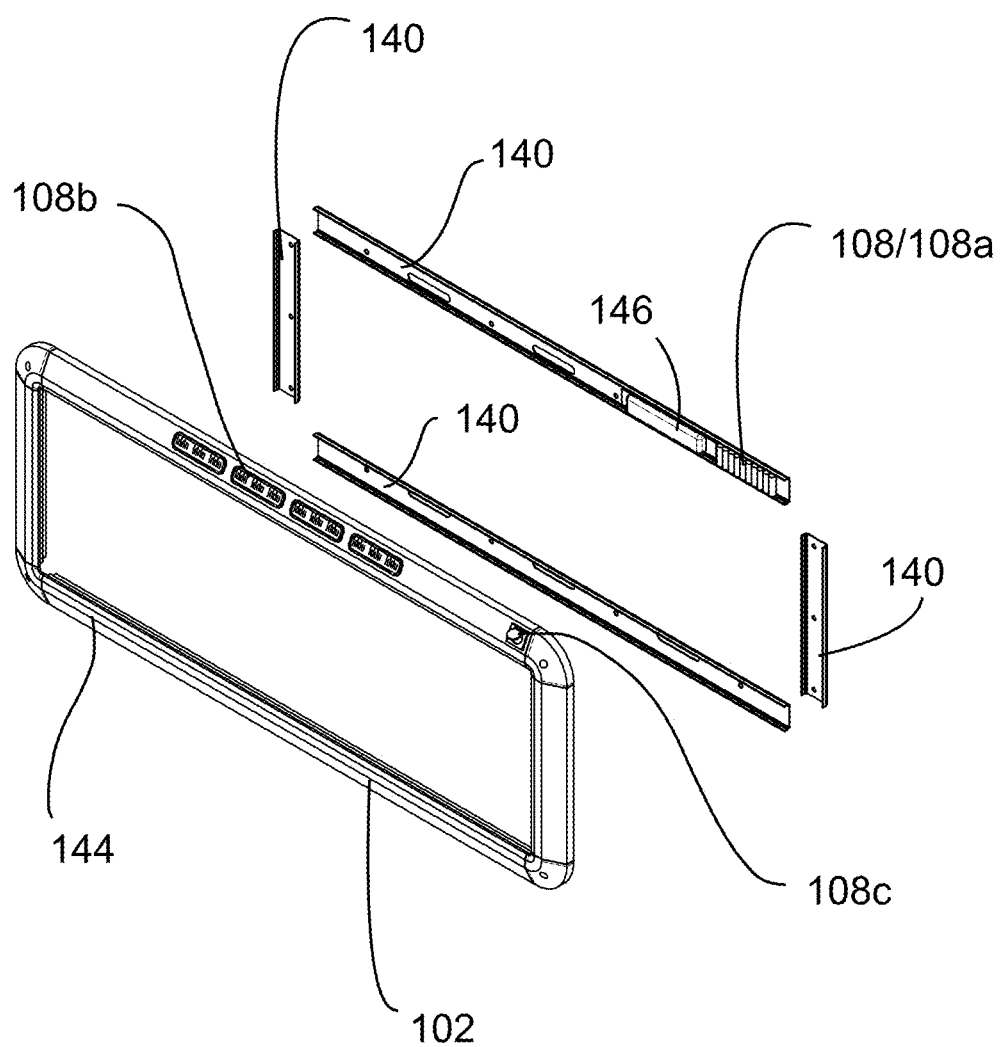
FIG. 5 illustrates an exploded isometric view of the housing of the driver communication system.
Figure 6:
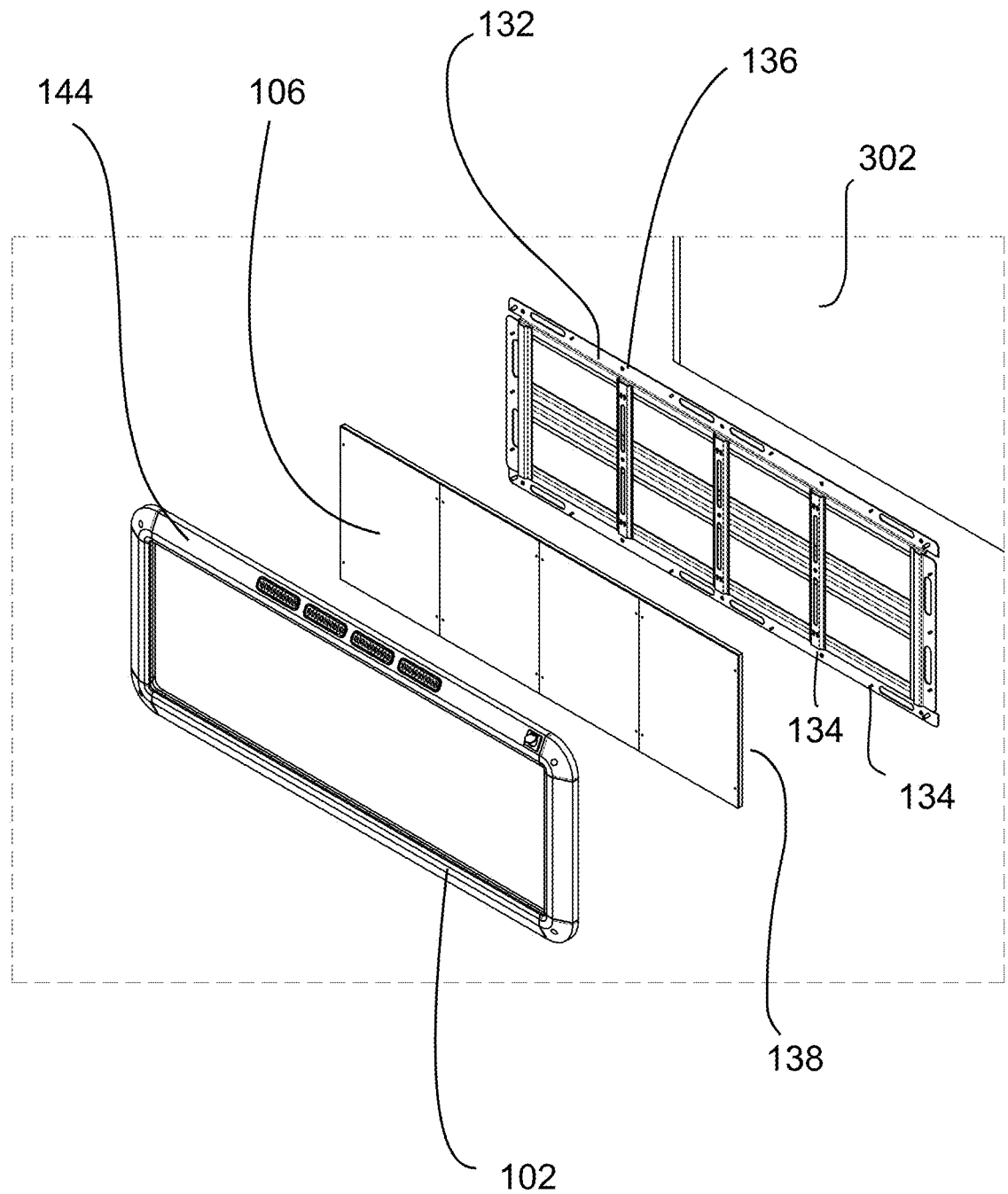
FIG. 6 illustrates an exploded isometric view of the driver communication system.
Figure 7:
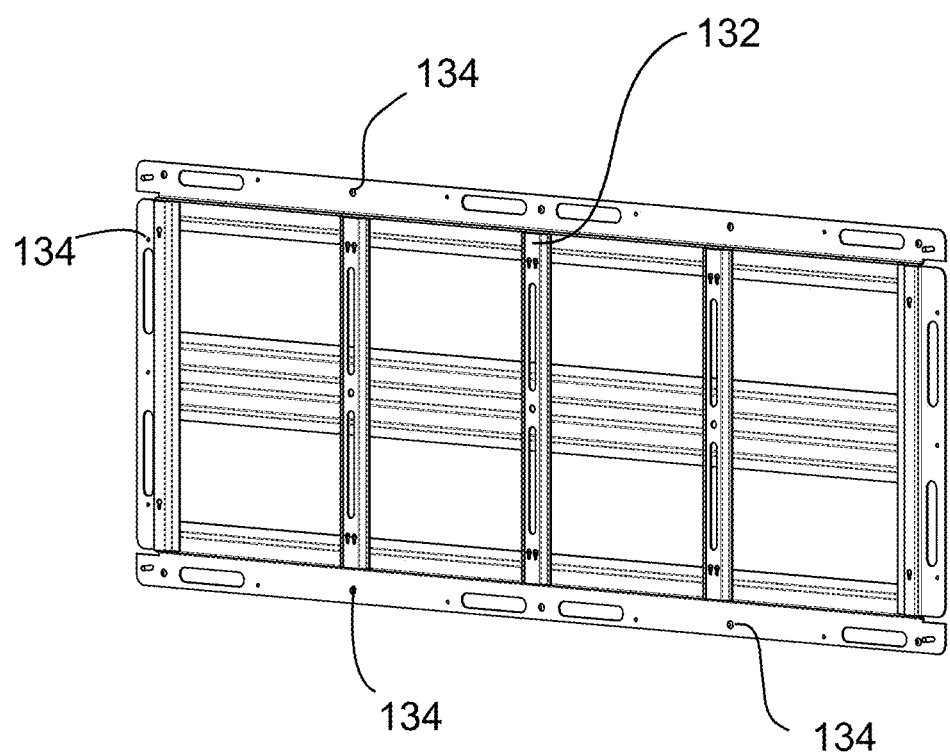
FIG. 7 illustrates an isometric view of the bracket of the driver communication system.
Figure 8:
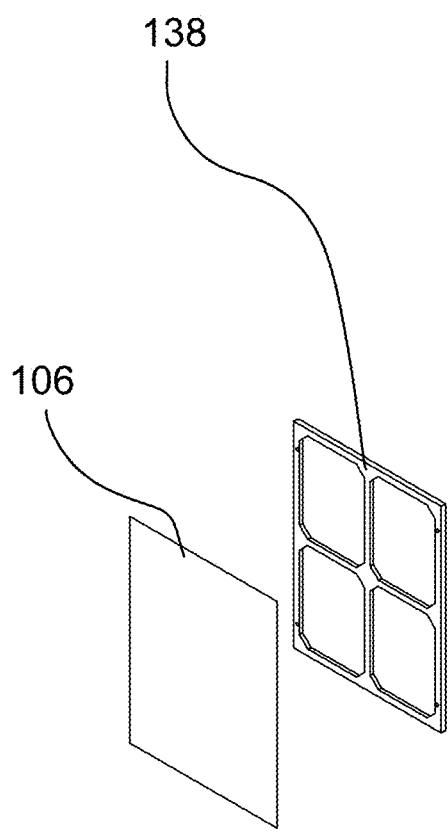
FIG. 8 illustrates an isometric view of the display and display mount bracket of the driver communication system.
Figure 9:
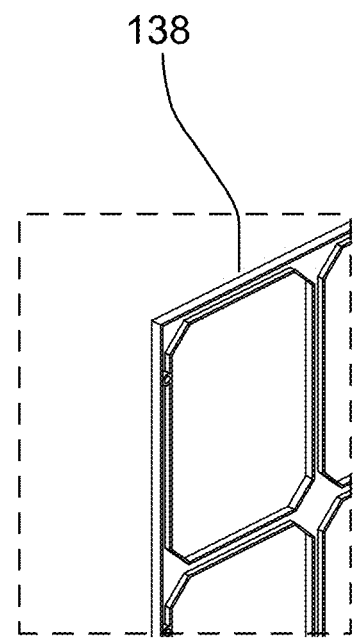
FIG. 9 illustrates a partial enlarged isometric view of the display mount bracket of the driver communication system.
Figure 10:
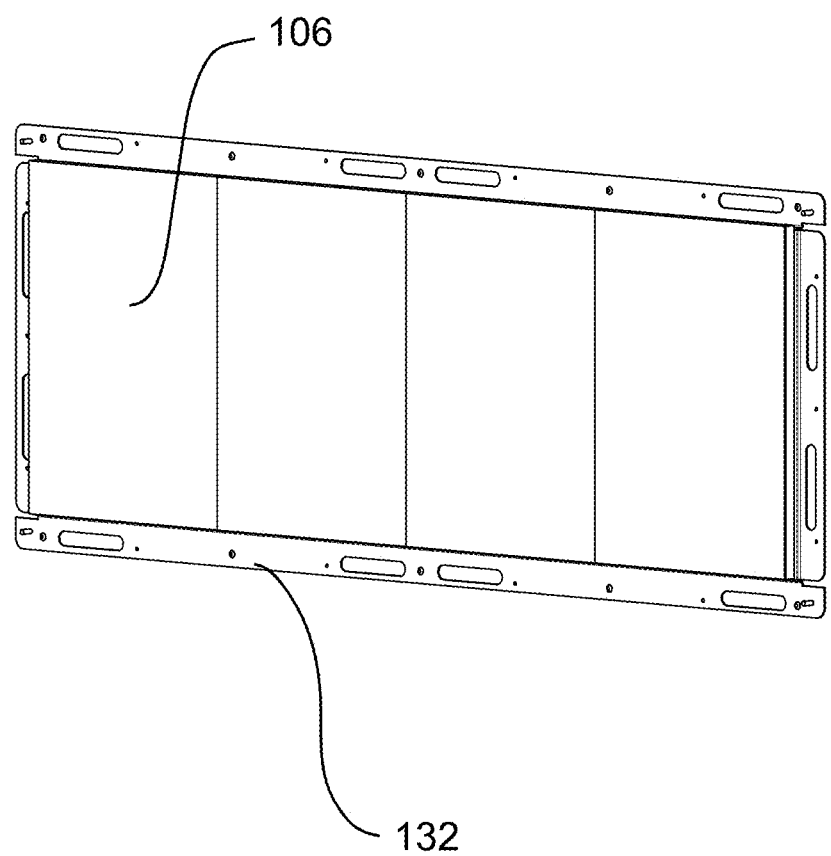
FIG. 10 illustrates an isometric view of the display mounted to the bracket of the driver communication system.
Figure 11:
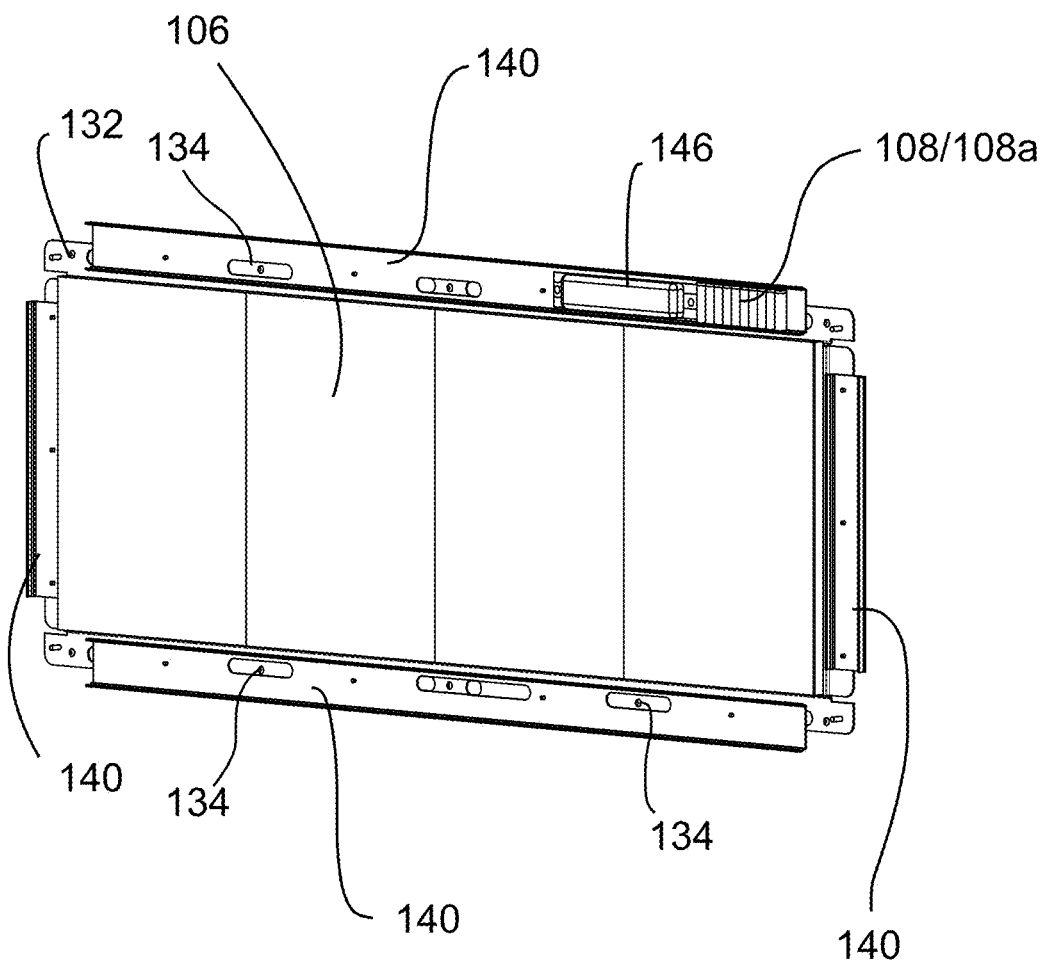
FIG. 11 illustrates an isometric view of the display and channels mounted to the bracket of the driver communication system.
Figure 12:
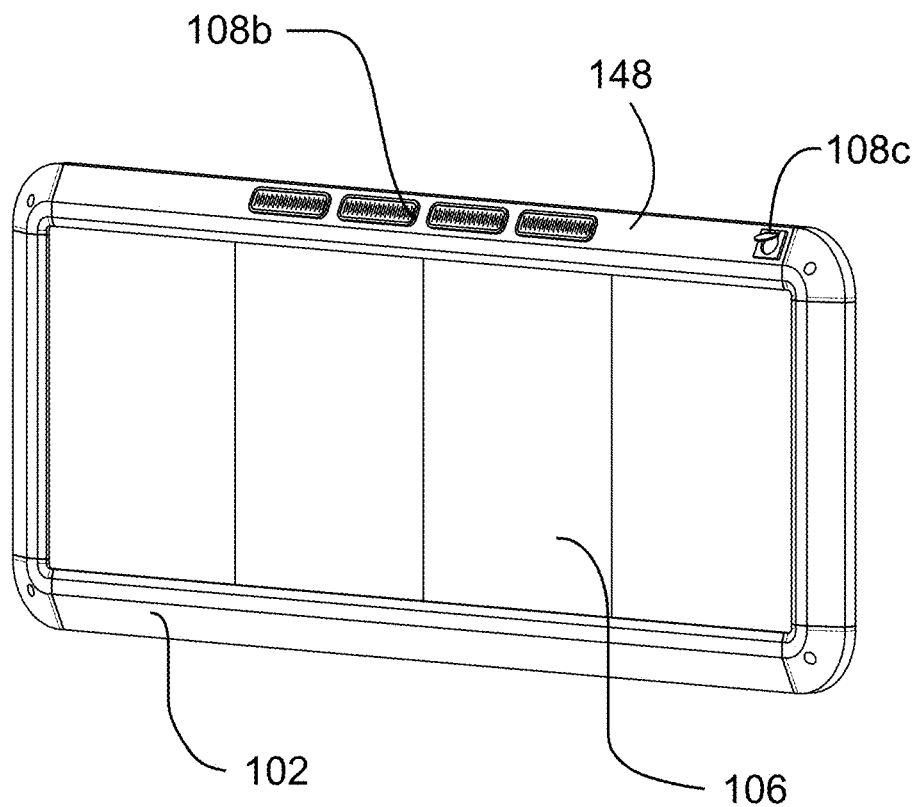
FIG. 12 illustrates an isometric view of the driver communication system.
Figure 13:
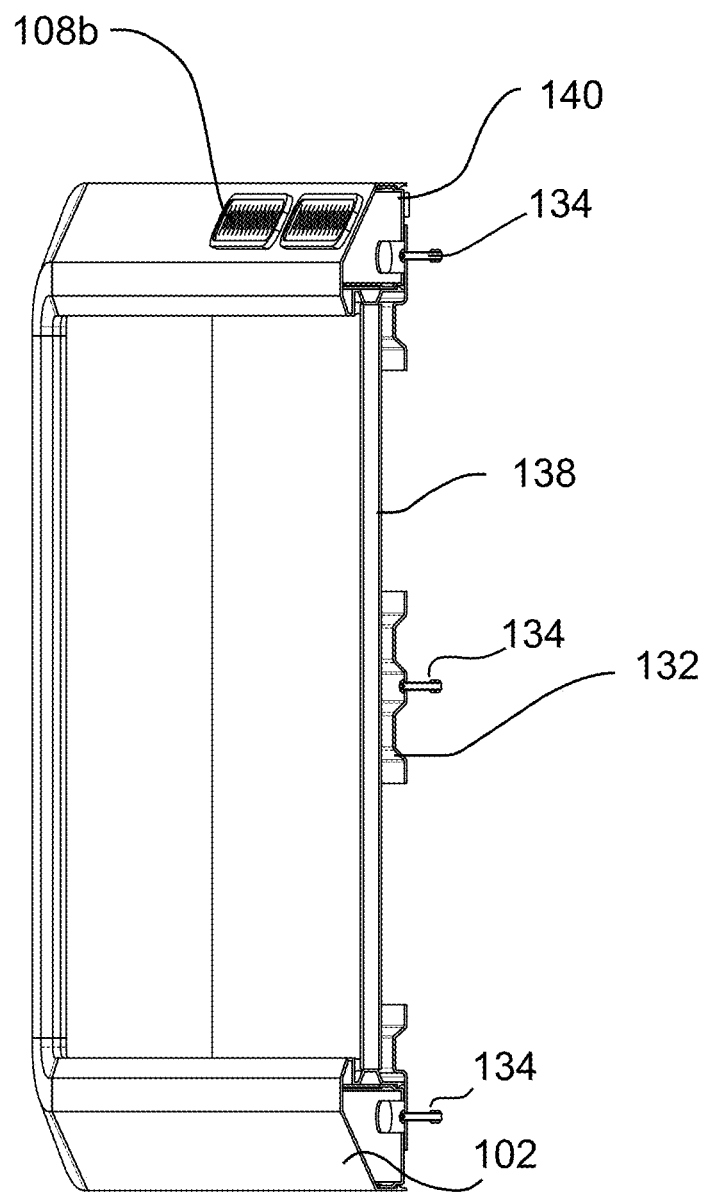
FIG. 13 illustrates a side-cutaway view of the driver communication system.
Figure 14:
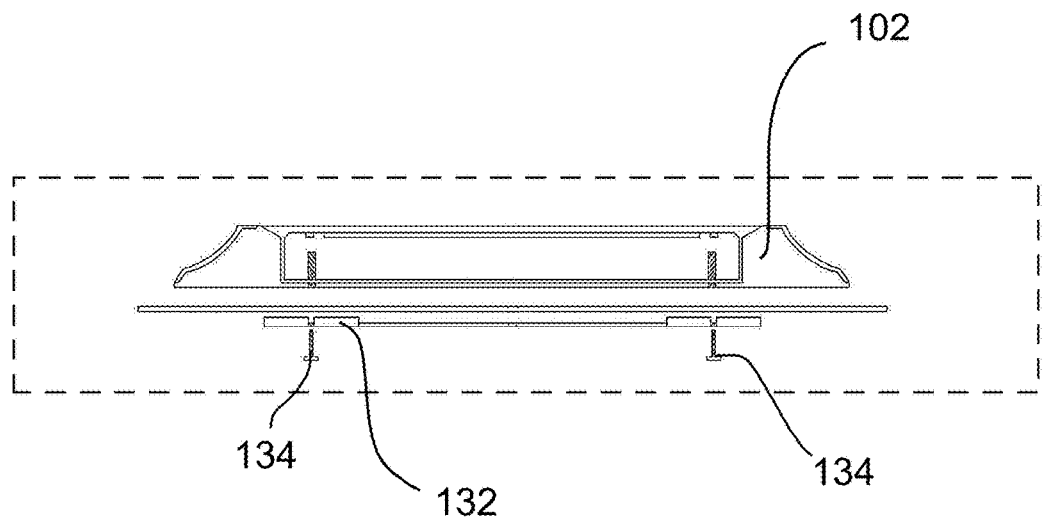
FIG. 14 shows a side view illustrating a mounting bracket of the driver communication system.
Figure 15:
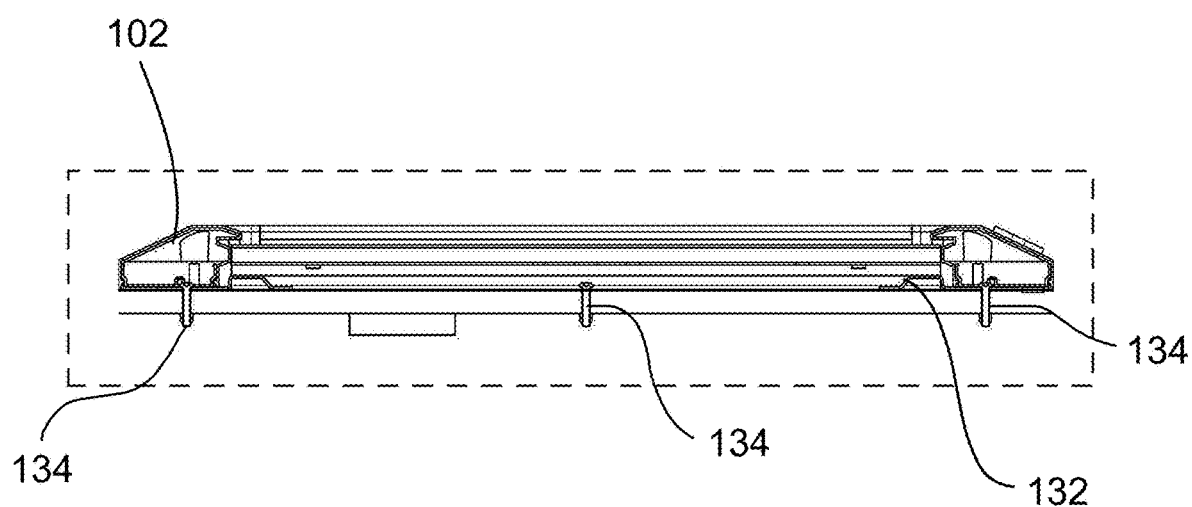
FIG. 15 shows a side view illustrating a mounting bracket of the driver communication system.
Figure 16:
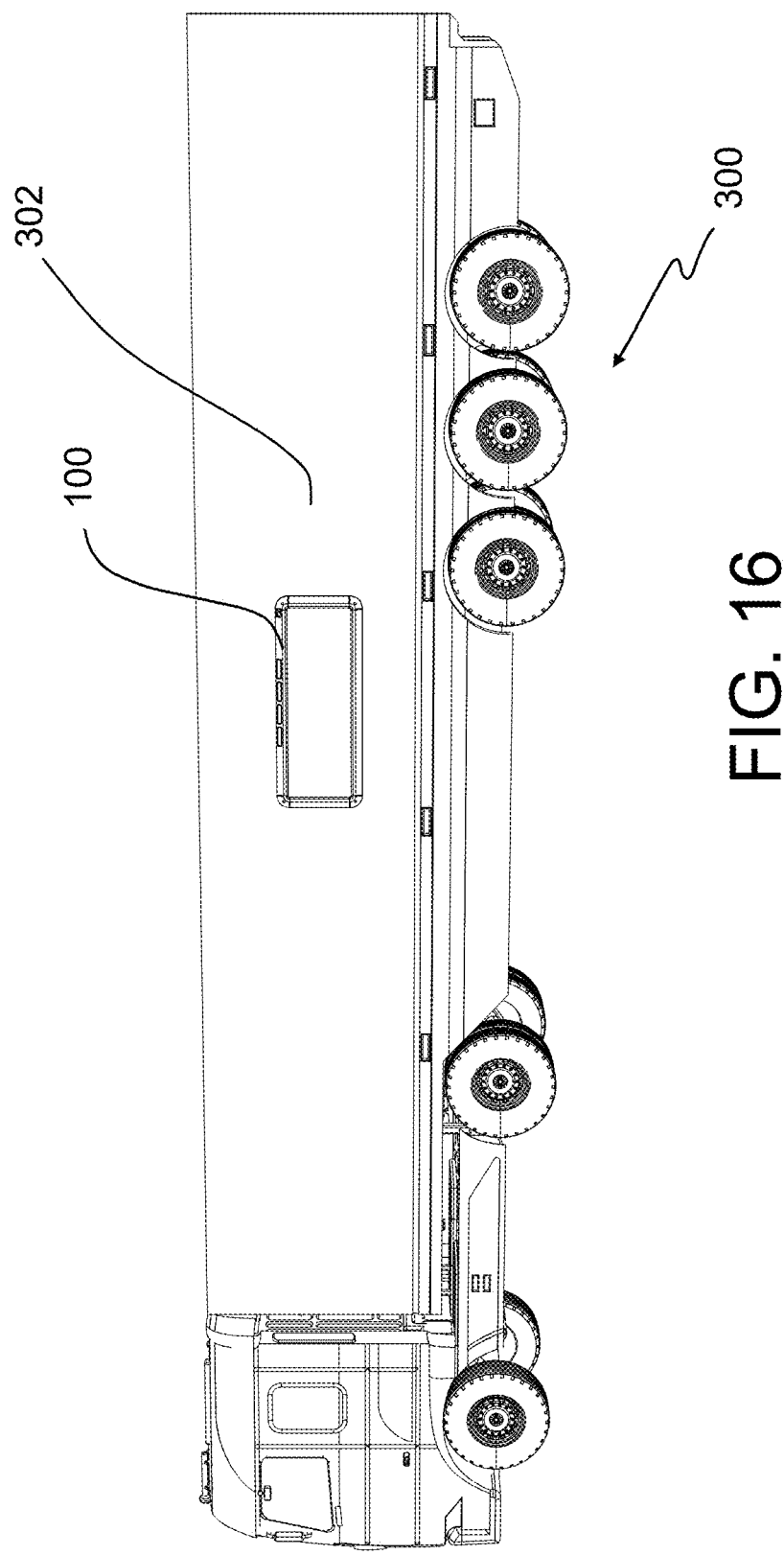
FIG. 16 illustrates a conceptual view of the driver communication system mounted to the side of a trailer.

FIG. 1 illustrates an isometric view of a trailer of a vehicle 300 having a driver communication system 100 attached thereto. FIG. 2 illustrates a bottom-front isometric view of the driver communication system 100. FIG. 3 illustrates a front view of the driver communication system 100. FIG. 4 illustrates top view of the driver communication system 100. FIG. 5 illustrates an exploded isometric view of the housing 102 of the driver communication system 100. FIG. 6 illustrates an exploded isometric view of the driver communication system 100. FIG. 7 illustrates an isometric view of the bracket 132 of the driver communication system 100. FIG. 8 illustrates an isometric view of the display 106 and display mount bracket 138 of the driver communication system 100. FIG. 9 illustrates a partial enlarged isometric view of the display mount bracket 138 of the driver communication system 100. FIG. 10 illustrates an isometric view of the display mounted to the bracket 132 of the driver communication system 100. FIG. 11 illustrates an isometric view of the display 106 and channels 140 mounted to the bracket 132 of the driver communication system 100. FIG. 12 illustrates an isometric view of the driver communication system 100. FIG. 13 illustrates a side-cutaway view of the driver communication system 100. FIG. 14 shows a side view illustrating a mounting bracket 132 of the driver communication system 100. FIG. 15 shows a side view illustrating a mounting bracket 132 of the driver communication system 100. FIG. 16 illustrates a conceptual view of the driver communication system 100 mounted to the side wall 302 of a trailer of a vehicle 300.

Figure 17:
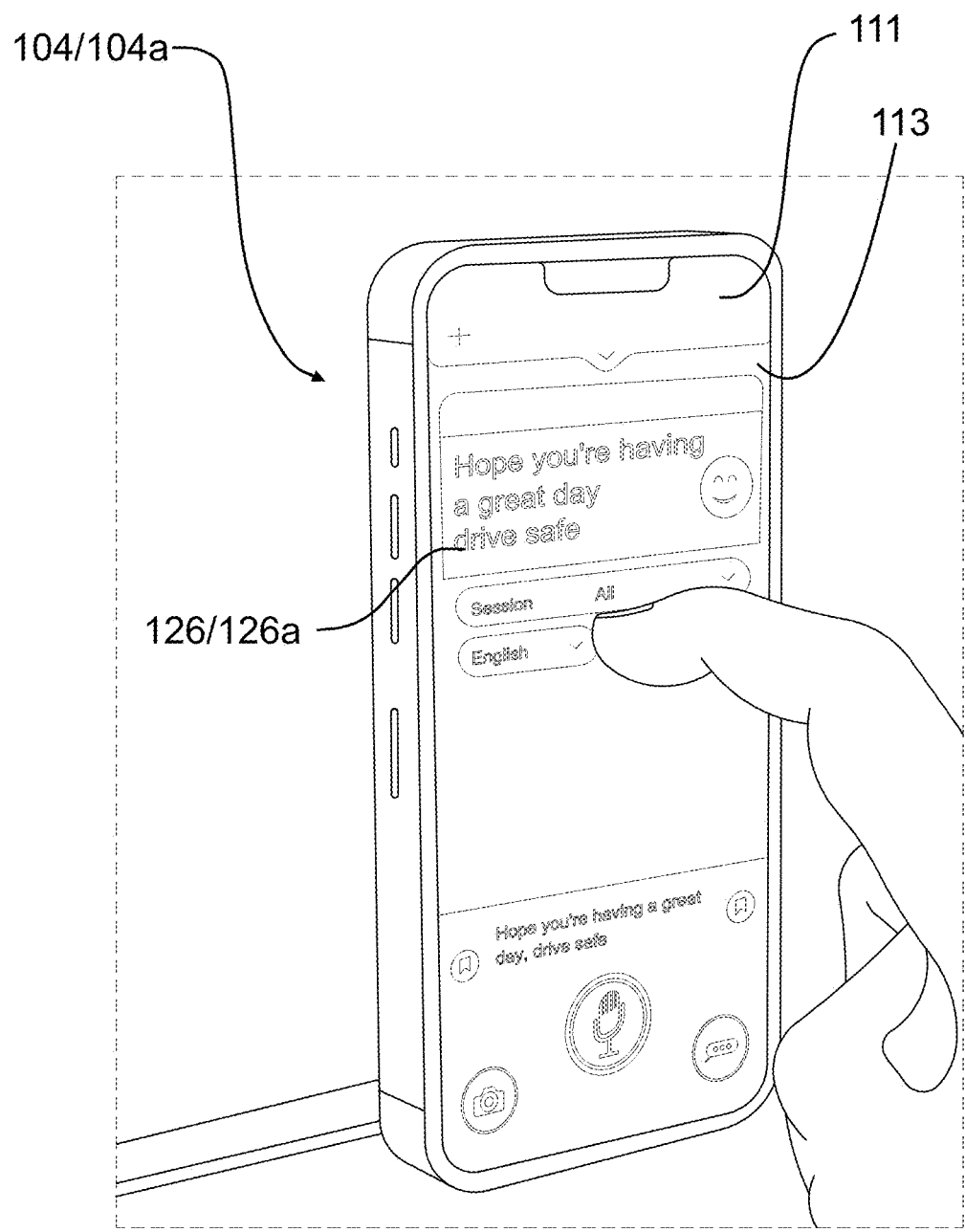
FIG. 17 illustrates a perspective view of the electronic communication device of the driver communication system with on-screen prompts.
Figure 18:
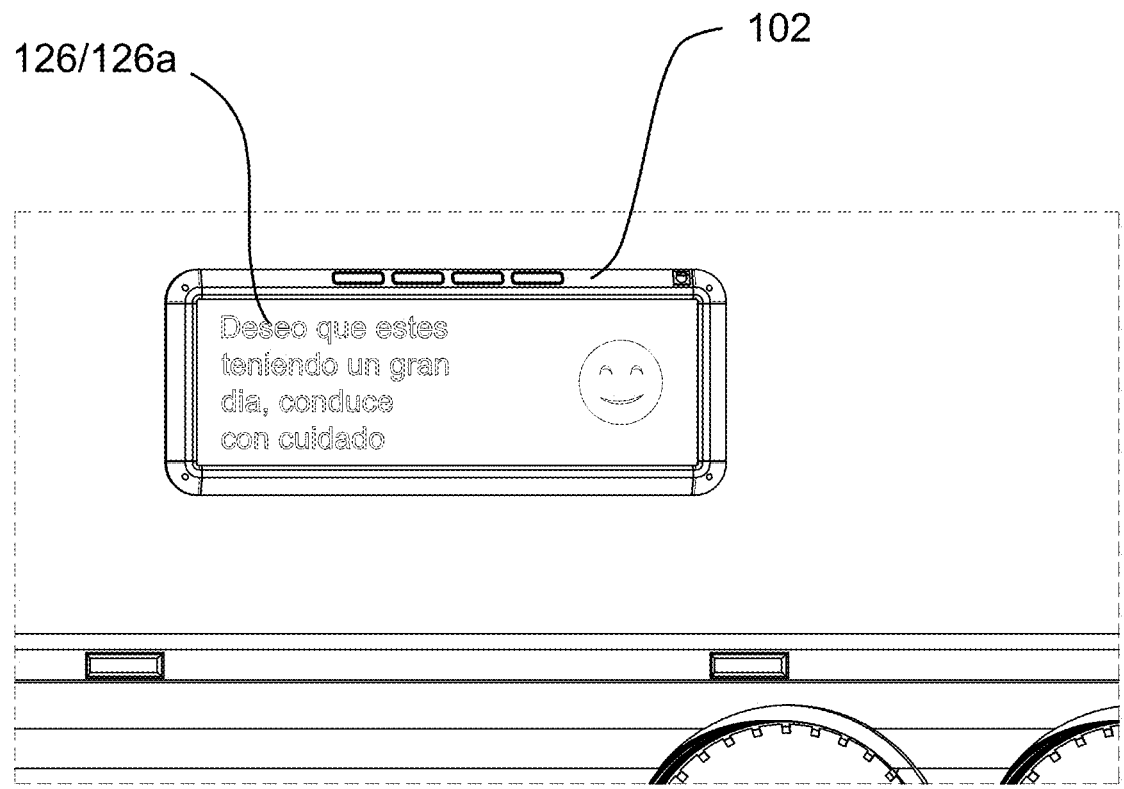
FIG. 18 illustrates a conceptual view of the driver communication system affixed to a trailer with a message displayed thereon.
Figure 19:
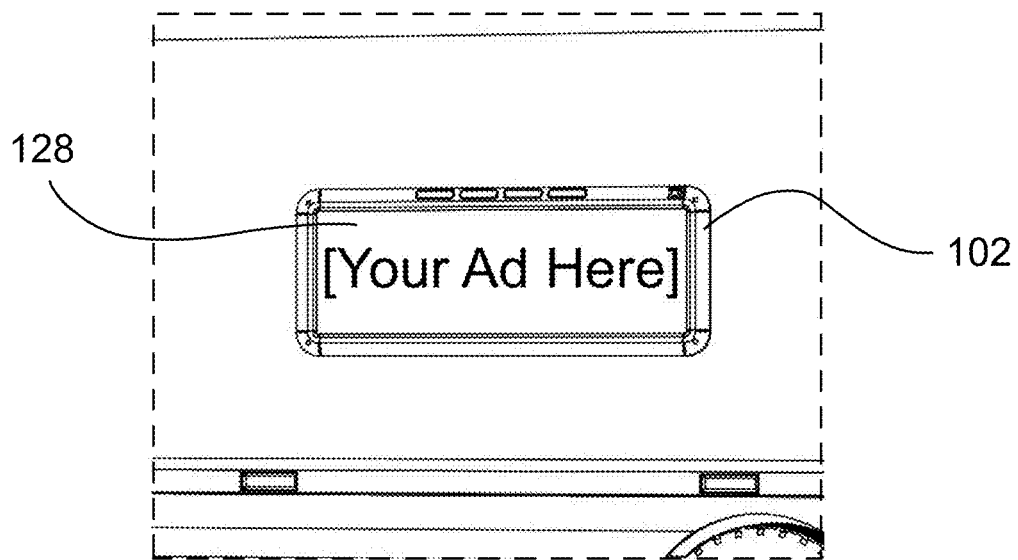
FIG. 19 illustrates a conceptual view of visual content displayed on the driver communication system.
Figure 20:
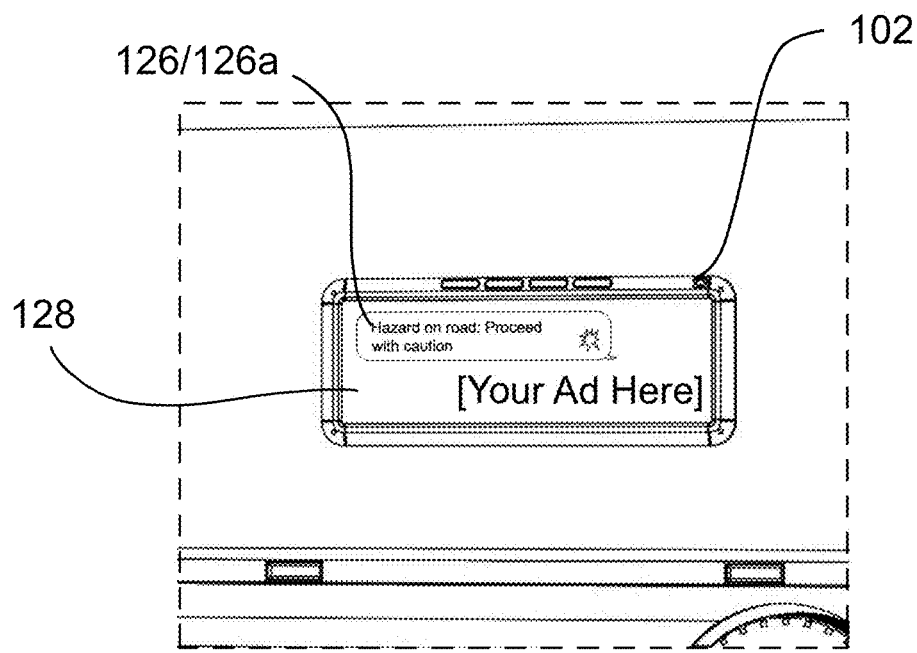
FIG. 20 illustrates a conceptual view of a message interrupting the visual content displayed on the driver communication system.

FIG. 17 illustrates a perspective view of the electronic communication device 104 of the driver communication system 100 with on-screen prompts. FIG. 18 illustrates a conceptual view of the driver communication system 100 affixed to a trailer of a vehicle 300 with a message 126 displayed thereon. FIG. 19 illustrates a conceptual view of visual content 128 displayed on the driver communication system 100. FIG. 20 illustrates a conceptual view of a message 126 interrupting the visual content 128 displayed on the driver communication system 100.

Figure 21:
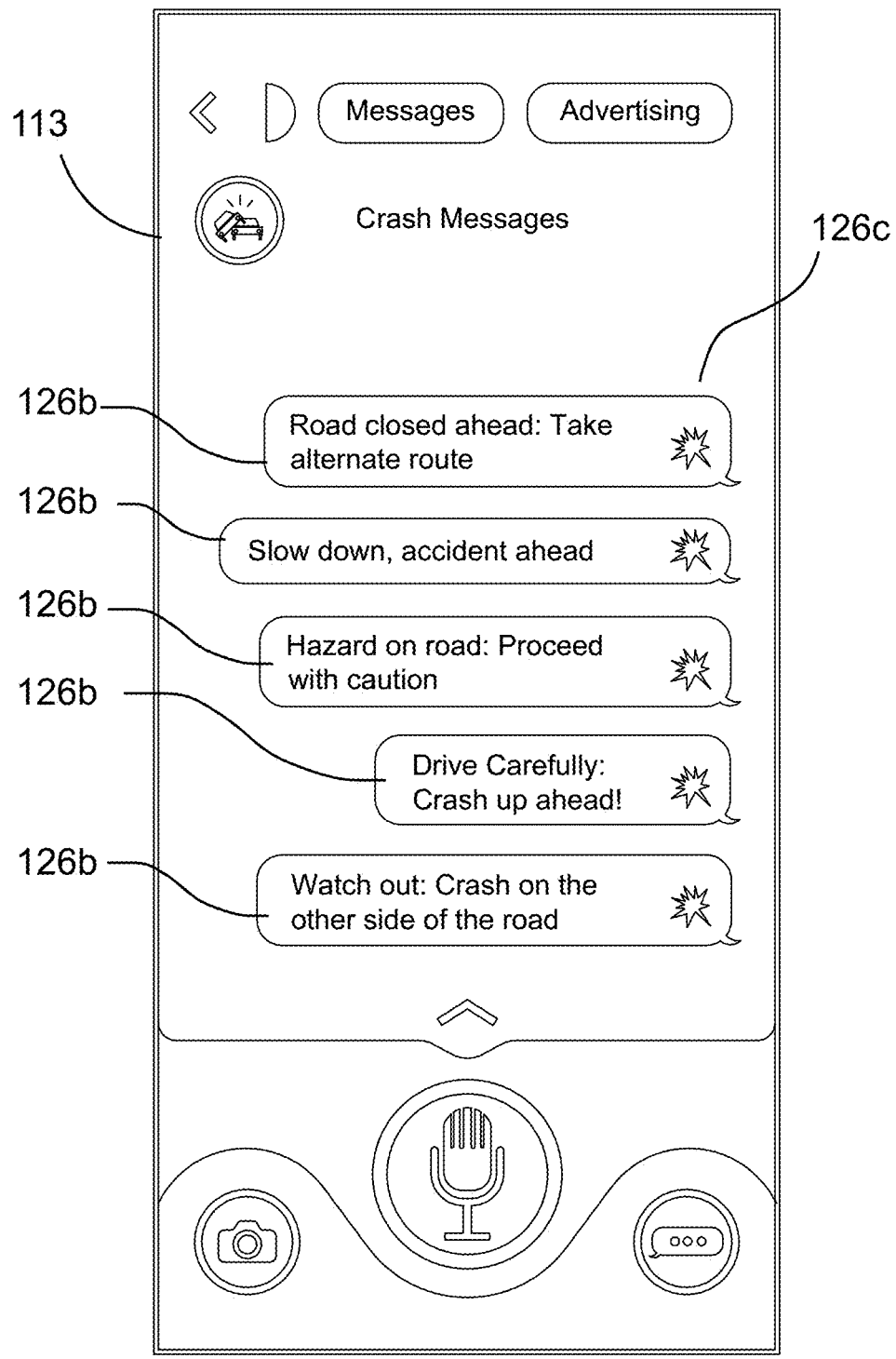
FIG. 21 illustrates a conceptual view of the graphic user interface of the electronic device of the driver communication system.
Figure 22:
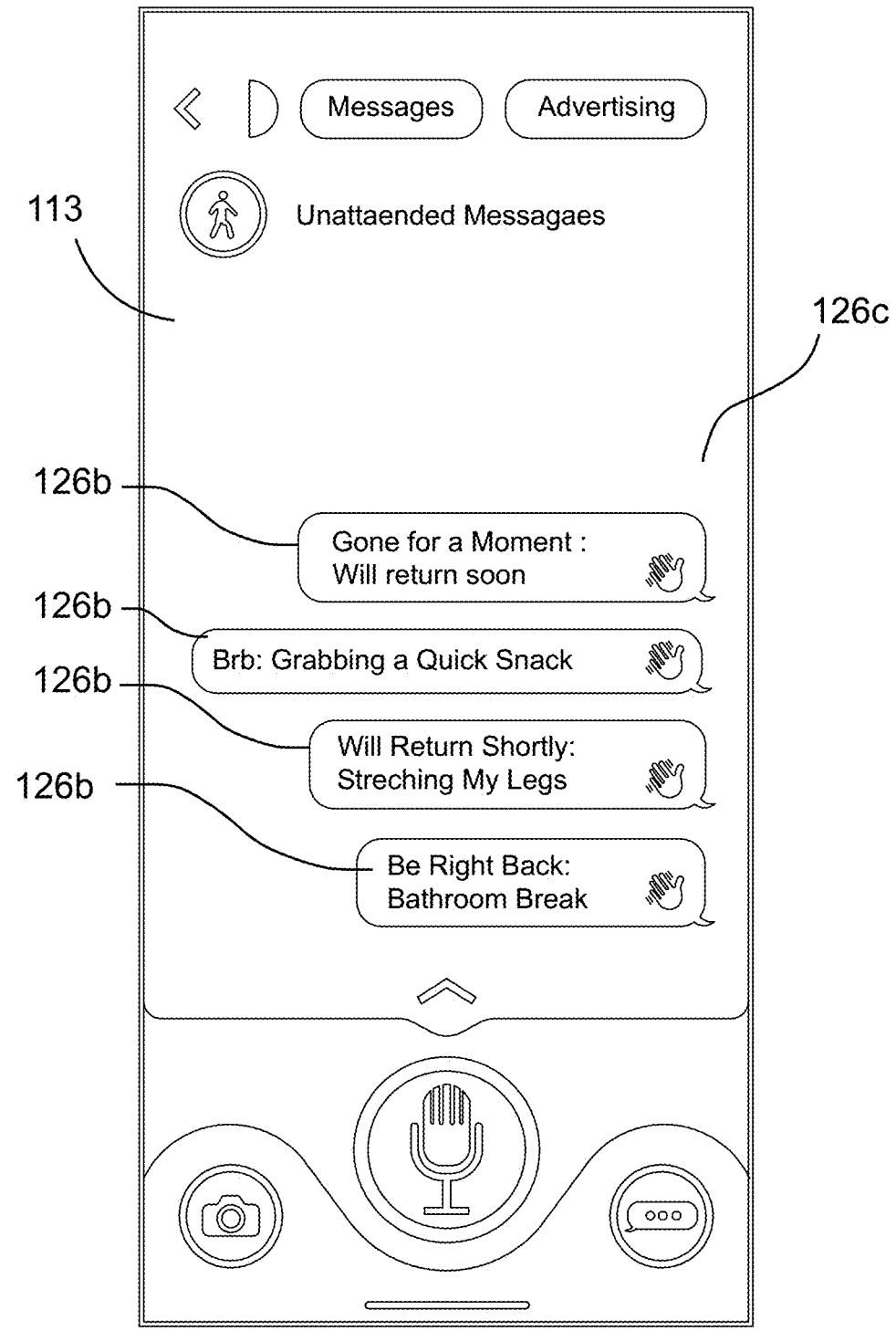
FIG. 22 illustrates a conceptual view of the graphic user interface of the electronic device of the driver communication system.
Figure 23:
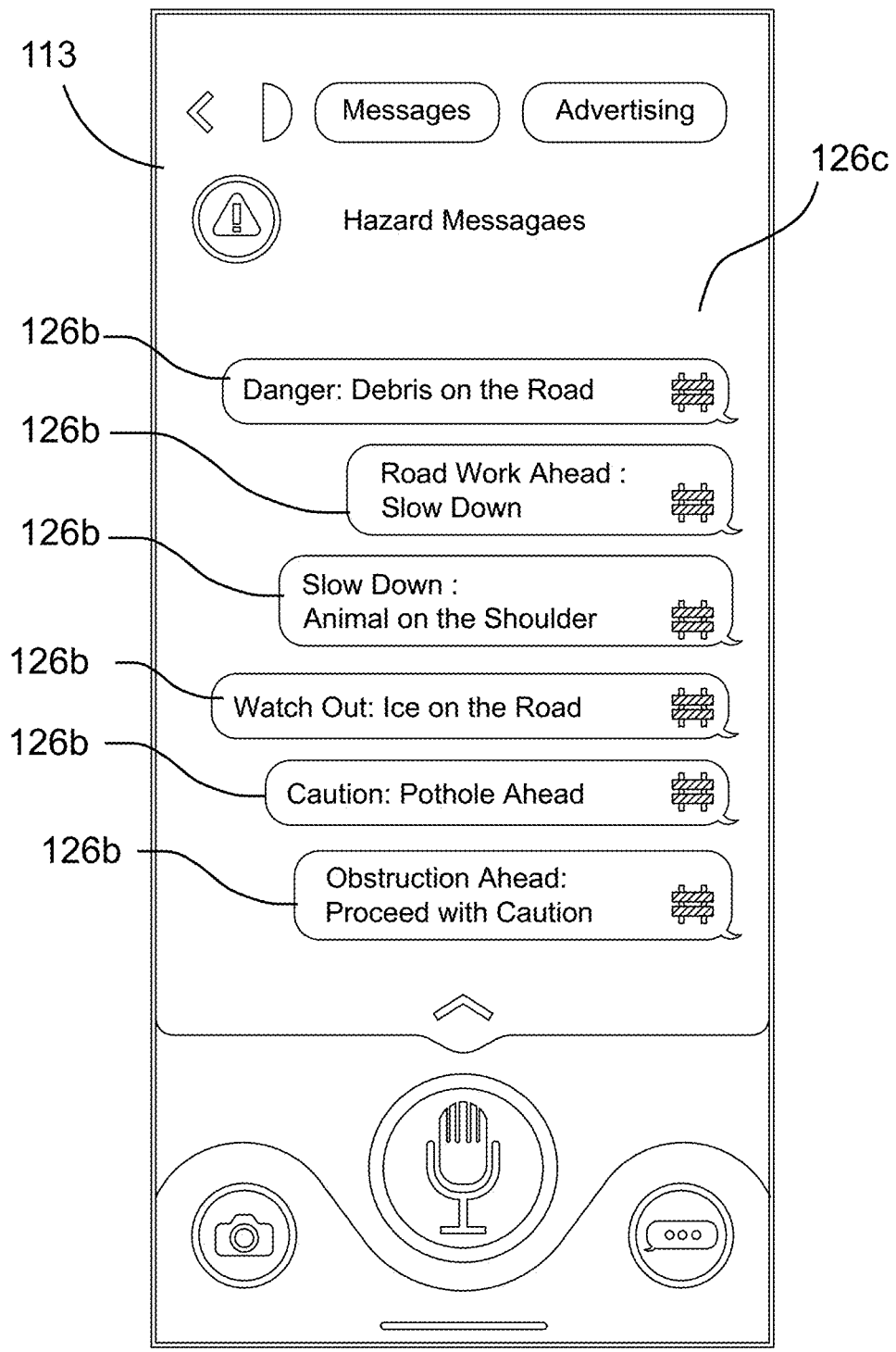
FIG. 23 illustrates a conceptual view of the graphic user interface of the electronic device of the driver communication system.
Figure 24:
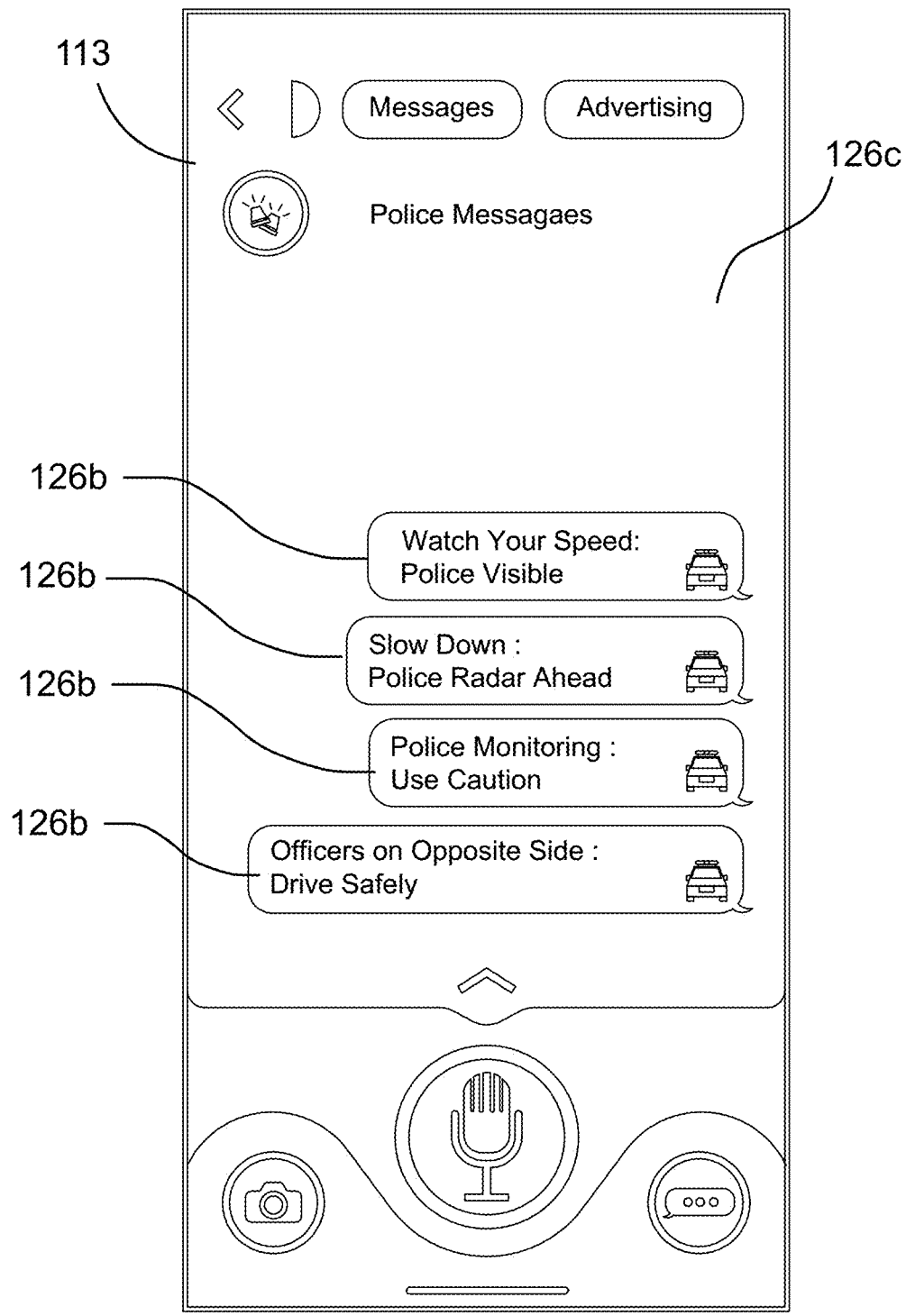
FIG. 24 illustrates a conceptual view of the graphic user interface of the electronic device of the driver communication system.
Figure 25:
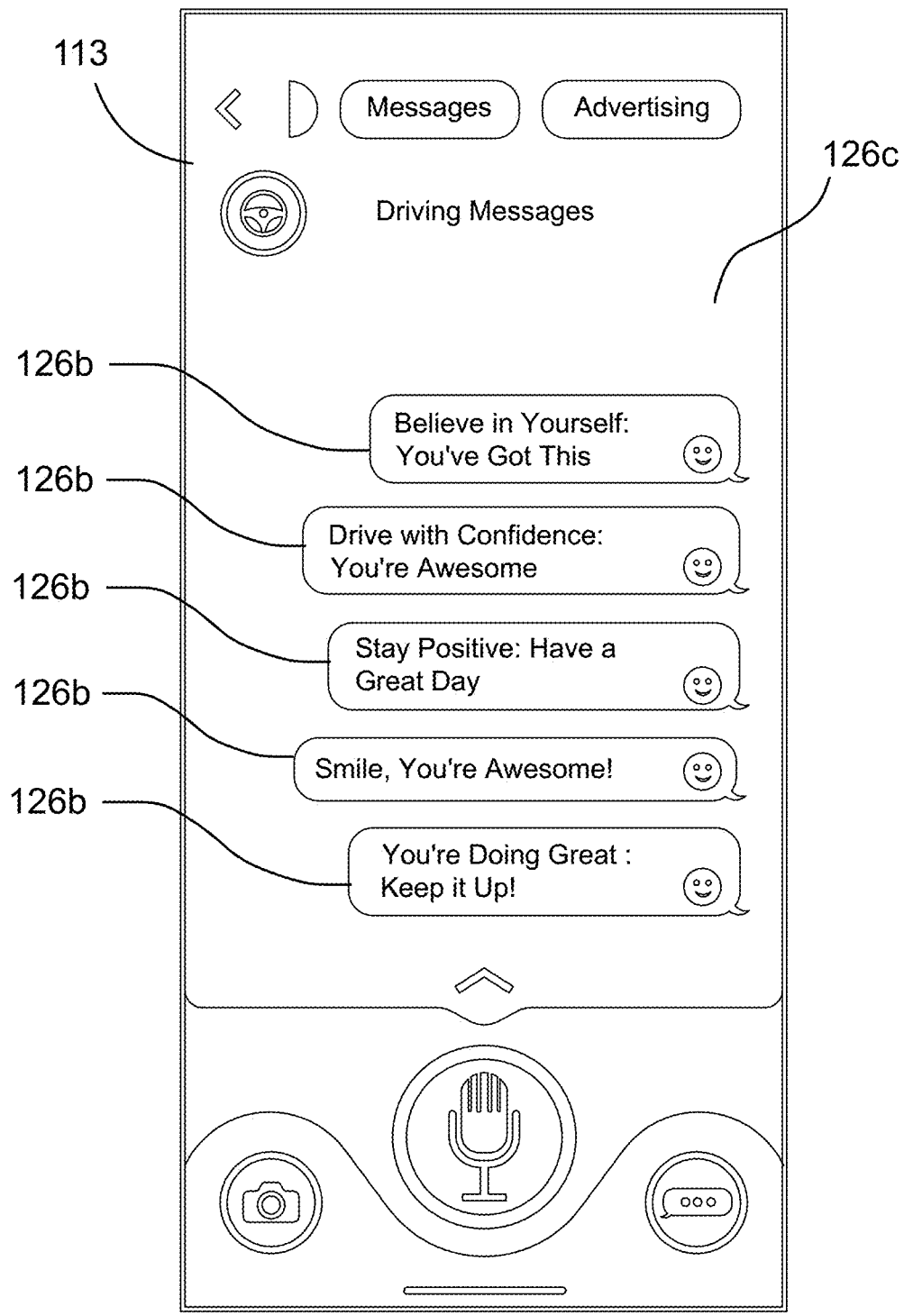
FIG. 25 illustrates a conceptual view of the graphic user interface of the electronic device of the driver communication system.

FIGS. 21-25 illustrate conceptual views of the graphic user interface 113 of the electronic device 104 of the driver communication system 100. FIG. 21 shows exemplary versions of pre-composed crash messages. FIG. 22 shows exemplary versions of pre-composed unattended vehicle messages. FIG. 23 shows exemplary versions of pre-composed hazard messages. FIG. 24 shows exemplary versions of pre-composed police messages. FIG. 25 shows exemplary versions of pre-composed general driving messages. Each figure in FIGS. 21-25 shows the microphone button, which can be used to transcribe a user's speech to text, which is thereby displayed onto the driver communication system 100.

Figure 26:
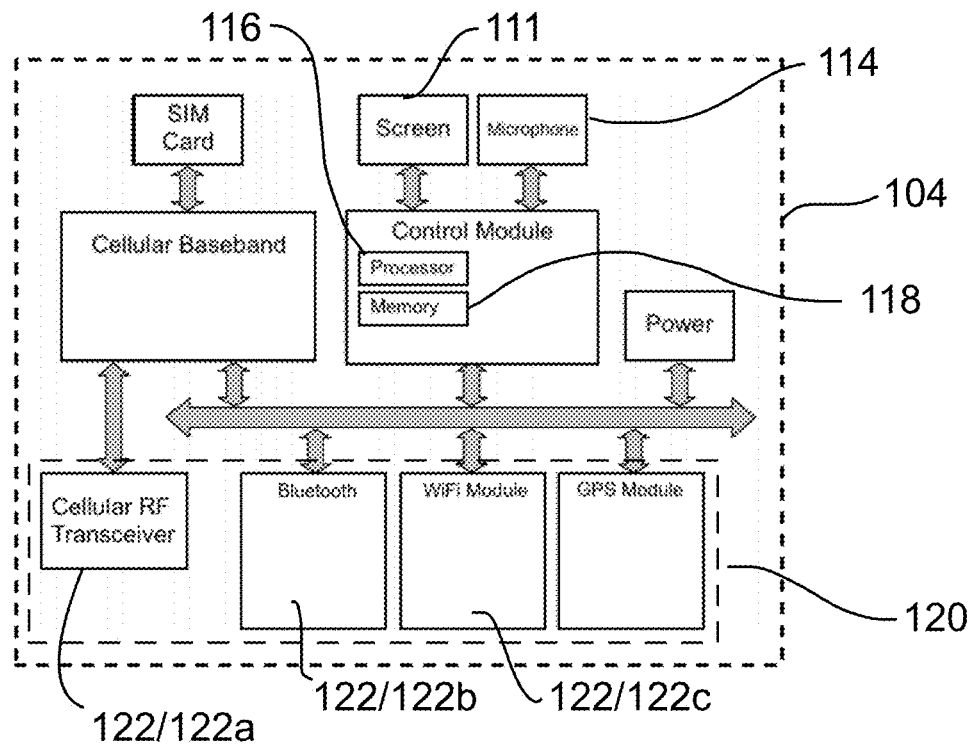
FIG. 26 illustrates a block diagram of the electronic system of a user's electronic device.
Figure 27:
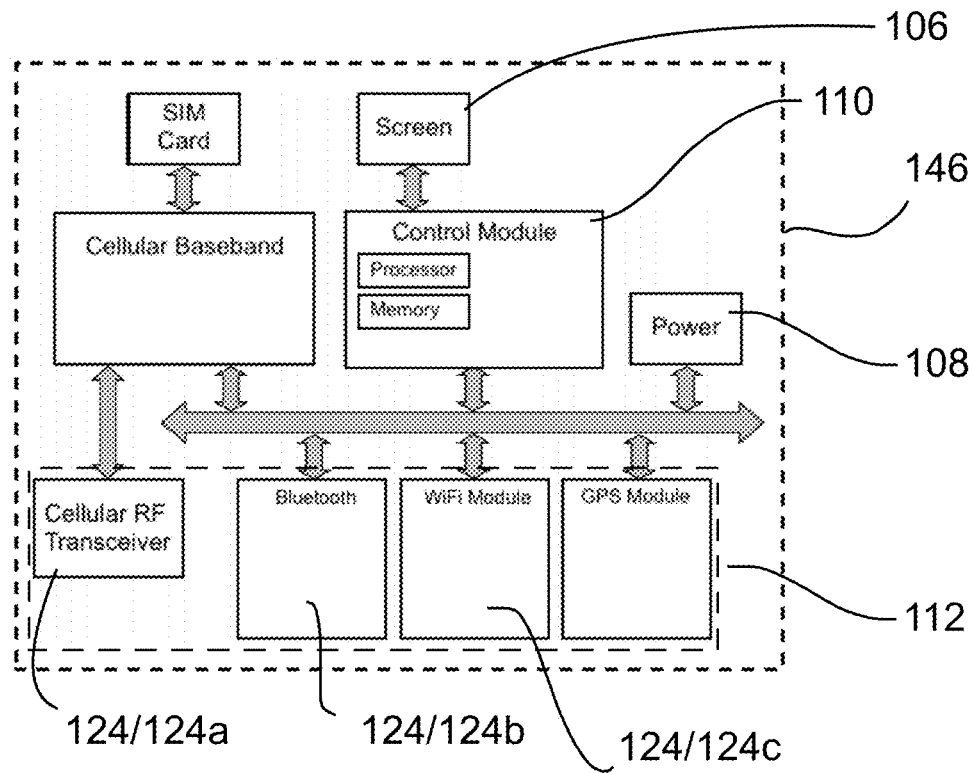
FIG. 27 illustrates a block diagram of the electronic system of the driver communication system.

FIGS. 26 and 27 illustrate exemplary block diagrams of the electronic components of the system 104/146. FIG. 26 illustrates a block diagram of the electronic system of a user's electronic device 104. FIG. 27 illustrates a block diagram of the electronic system of the driver communication system 100.

Figure 28:
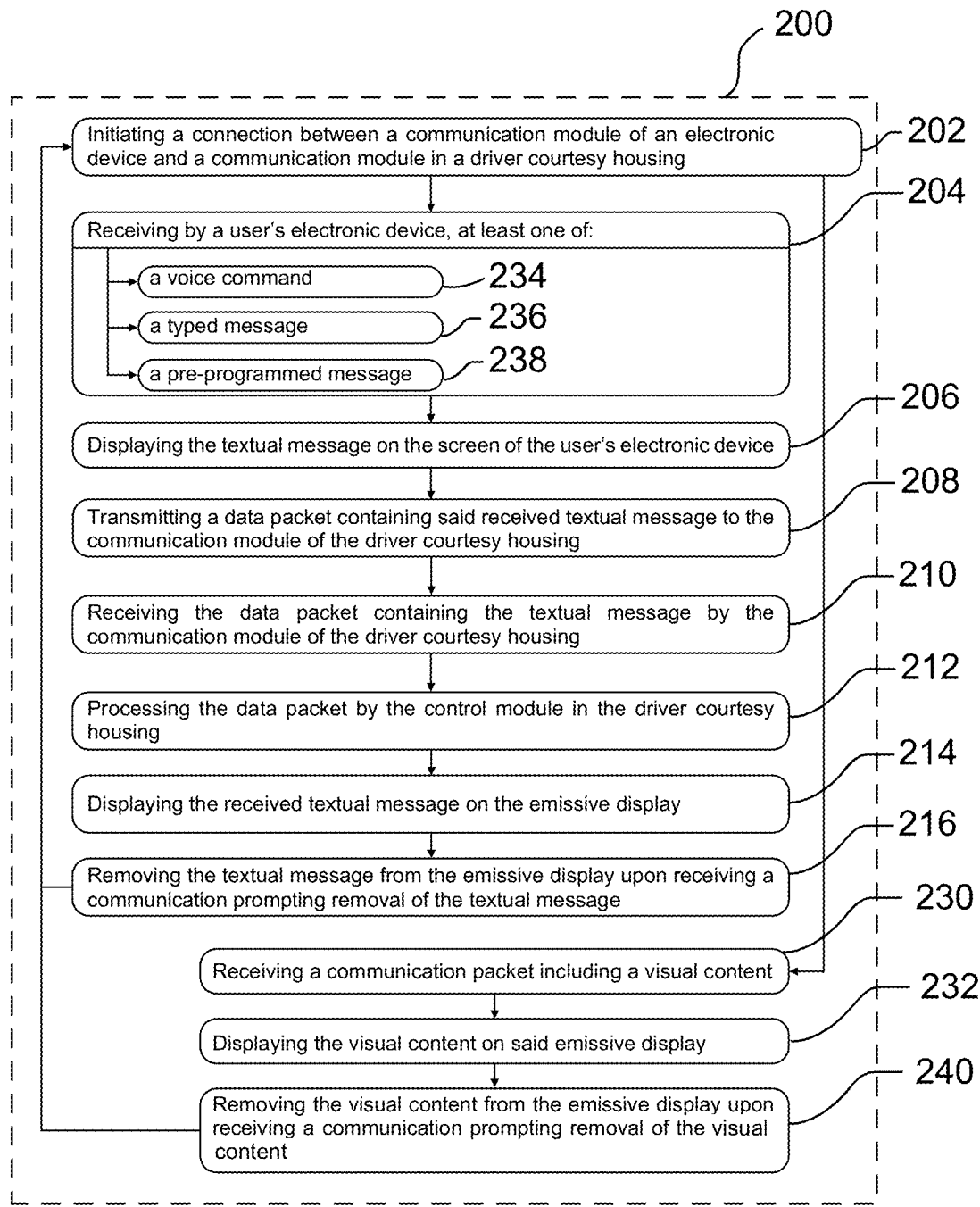
FIG. 28 illustrates a flow chart of the operation of the driver communication system.

FIG. 28 illustrates a flow chart of the operation of the program 200 of the driver communication system 100.

In an exemplary embodiment, an electronic driver courtesy system 100 is provided. The system comprises a driver courtesy housing 102 and an electronic device 104 for user operation.

The driver courtesy housing 102 is coupled to a vehicle 300 and positioned to be viewable to an outside audience. The driver courtesy housing 102 contains at least an emissive display 106, a power source 108, a control module 110 coupled to the emissive display 106, and at least one communication module 112 coupled to the control module 110. In some embodiments, the power source 108 is a rechargeable battery 108*a*, and yet in others, the power source may include a solar panel 108*b*.

The electronic device 104 has a screen 111 displaying a graphic user interface 113. The electronic device 104 also has at least one microphone 114, a processor 116, a memory 118, and at least one communication module 120 capable of selectively pairing with the communication module 112 in the driver courtesy housing 102. The communication module 112 of the electronic device 104 for user operation includes a means 122 for transmitting and receiving data packets to and from the communication module 112 coupled to the control module 110 of the driver courtesy housing 102, and the communication module 112 of the driver courtesy housing 102 includes a means 124 for transmitting and receiving data packets to and from the electronic device 104 for user operation. These means 122/124 are typically achieved through transmission of data packets from the cellular transmitter 122a, Bluetooth transmitter 122b, and/or Wi-Fi transmitter 122c of a user's smartphone 104a, and received by the same 124a/124b/124c integrated within the electronics of the driver courtesy housing 102.

In some embodiments, the means 122 for transmitting and receiving data packets in the communication module 120 of the electronic device 104 for user operation is a Bluetooth module 122b and the means 124 for transmitting and receiving data packets in the communication module 112 of the driver courtesy housing 102 is a Bluetooth module 124b.

In some embodiments, at least one communication module 112 is coupled to the control module 110 in the driver courtesy housing 102, which includes a cellular transmitter 124a and receiver (same as the transmitter module).

In some embodiments, the memory 118 of the electronic device 104 for user operation includes at least one program 200 stored thereon that, when executed by the processor, performs the steps of: (i) initiating 202 a connection between the communication module 120 of the electronic device 104 for user operation and the communication module 112 in the driver courtesy housing 102, (ii) receiving 204 a voice command by the at least one microphone 114 of the electronic device 104 for user operation, wherein the voice command includes a message to be displayed as a textual message 126 on the emissive display 106 of the driver courtesy housing 102, (iii) displaying 206 the textual message 126 to be displayed on the emissive display 106 of the driver courtesy housing 102 on the screen 111 of the electronic device 104 for user operation, (iv) transmitting 208 a data packet containing the textual message 126 to be displayed on the emissive display 106 of the driver courtesy housing 102 to the communication module 112 coupled to the control module 110 of the driver courtesy housing 102, (v) receiving 210 the data packet containing the textual message 126 to be displayed on the emissive display 106 by the communication module 112 coupled to the control module 110 of the driver courtesy housing 102, (vi) processing 212 the data packet containing the textual message 126 to be displayed on the emissive display 106 of the driver courtesy housing 102, wherein the data packet is processed by the control module 110, (vii) displaying 214 on the emissive display 106 of the driver courtesy housing 102, the textual message 126, received from the electronic device 104 for user operation, and (viii) removing 216 the textual message 126 from the emissive display 106 upon receiving a communication prompting removal of the textual message 126 from the emissive display 106.

In some embodiments, the at least one program stored on the memory of the electronic device for user operation further includes the step of receiving 218 an input received through user engagement of the graphic user interface 113 of the screen 111 of the electronic device 104 for user operation, wherein the input received through user engagement of the graphic user interface of the screen includes a typed message 126a to be displayed as a textual message 126 on the emissive display 106 of the driver courtesy housing 102.

In some embodiments, the at least one program stored on the memory of the electronic device for user operation further includes the step of receiving 220 an input received through user engagement of the graphic user interface 113 of the screen 111 of the electronic device 104 for user operation, wherein the input received through user engagement of the graphic user interface 113 of the screen 111 includes a selection of one pre-programmed message 126b in a list 126c of pre-programmed messages 126b to be displayed as a textual message 126 on the emissive display 106 of the driver courtesy housing 102.

In some embodiments, the step of receiving 204 a voice command by the at least one microphone 114 of the electronic device 104 for user operation, includes a sub-step of filtering the textual messages for predesignated inappropriate messages by comparing the textual message received to a stored list of black-listed messages and keywords, including variations of those messages and keywords, whereby if detected, the filter terminates transmission of the textual message to the communication module 112 in the driver courtesy housing 102.

In some embodiments, the at least one program stored on the memory 118 of the electronic device 104 for user operation includes, further includes the step of receiving 230, by a cellular transmitter/receiver 124a, a communication packet including a visual content 128, wherein the visual content is capable of displaying static images, videos, animations, or any combination thereof. The program further includes displaying 232 the visual content on the emissive display 106. The visual content is displayed in a subservient position to the textual message, if a textual message is displayed on the emissive display 106. In some embodiments, the visual content is an advertisement pushed to the emissive display 106 from a remote device, such as a user's electronic device 104. In some embodiments, the textual message is received from a cellularly transmitted communication packet received by the cellular transmitter/receiver 124a. The process further includes removing 216 the visual content 128 from the emissive display 106 upon receiving a communication prompting removal of the visual content 128 from the emissive display 106.

In some embodiments, the driver courtesy housing 102 includes a camera 130 mounted thereon and coupled to the control module 110.

In some embodiments, the driver courtesy housing 102 is mounted through a wall 302 of the vehicle 300 which it is mounted to, such as the trailer of a semi-truck. In some embodiments, the driver courtesy housing 102 is mounted to the outside of the vehicle 300 in which it is mounted to without penetrating the wall 302, for example, using magnets. In some embodiments, such as in passenger vehicles, the driver courtesy is mounted in the rear-view window of a passenger vehicle.

In some embodiments of the electronic driver courtesy 100, the driver courtesy housing 102 comprises a mounting bracket 132 connectable to the vehicle having a plurality of connection points 134 and a structural skeletal frame 136, at least one emissive display securement bracket 138 coupling at least one emissive display 106 to the mounting bracket 132, a plurality of channel brackets 140 mounted to said mounting bracket 132 and positioned around a circumference of the emissive display 106 array 142, and a housing frame 144 mounting to and covering said plurality of channel brackets 140. The channel brackets 140 house electronic components includes an electronics housing 146, containing at least one communication module 112 and at least one control module 110. The housing frame has solar panels 108b embedded within its outer surfaces 148 and a power port 108c integrated therewith. In some embodiments, the emissive display 106 comprises an array of a plurality of emissive displays 106, which may lead to increased scalability.

In another exemplary embodiment, an electronic driver courtesy 100 system is provided. The electronic driver courtesy 100 system comprises a driver courtesy housing 102 and an electronic device 104 for user operation. The driver courtesy housing 102 is coupled to a vehicle 300 and positioned to be viewable to an outside audience. The driver courtesy housing 102 contains at least an emissive display 106, a power source 108, a control module 110 coupled to the emissive display 106, and at least one communication module 112 coupled to the control module 110.

The electronic device 104 has a screen 111 displaying a graphic user interface 113. The electronic device also contains at least one microphone 114, a processor 116, a memory 118, and at least one communication module 120 capable of selectively pairing with the at least one communication module 112 in the driver courtesy housing 102. The at least one communication module 120 of the electronic device 104 for user operation includes a means 122 for transmitting and receiving data packets to and from the at least one communication module 112 coupled to the control module 110 of the driver courtesy housing 102, and the at least one communication module 112 of the driver courtesy housing 102 includes a means 124 for transmitting and receiving data packets to and from the electronic device 104 for user operation.

The memory 118 of the electronic device 104 for user operation includes at least one program 200 stored thereon that, when executed by the processor 116, performs the steps of (i) initiating 202 a connection between the at least one communication module 120 of the electronic device 104 for user operation and the at least one communication module 112 in the driver courtesy housing 102, (ii) receiving 204 a user input, (iii) displaying 206 a received textual message 126 to be displayed on the emissive display 106 of the driver courtesy housing 102 on the screen 111 of the electronic device 104 for user operation, (iv) transmitting 208 a data packet containing the received textual message to be displayed on the emissive display 106 of the driver courtesy housing 102 to the at least one communication module 112 coupled to the control module 110 of the driver courtesy housing 102, (v) receiving 210 the data packet containing the received textual message 126 to be displayed on the emissive display 106 by the at least one communication module 112 coupled to the control module 110 of the driver courtesy housing 102#, (vi) processing 212 the data packet containing the received textual message 126 to be displayed on the emissive display 106 of the driver courtesy housing 102, processed by the control module 110, (vii) displaying 214 on the emissive display 106 of the driver courtesy housing 102 the received textual message 126, received from the electronic device 104 for user operation, and (viii) removing the received textual message from the emissive display 106 upon receiving a communication prompting removal of the received textual message from the emissive display 106.

The user input includes at least one of (i) a voice command 234 by the at least one microphone 114 of the electronic device 104 for user operation, wherein the voice command 234 includes a message to be displayed as a textual message on the emissive display 106 of the driver courtesy housing 102, (ii) an input 236 received through user engagement of the graphic user interface 113 of the screen 111 of the electronic device 104 for user operation, wherein the input received through user engagement of the graphic user interface 113 of the screen 111 includes a typed message to be displayed as a textual message on the emissive display 106 of the driver courtesy housing 102, and/or (iii) an input 238 received through user engagement of the graphic user interface 113 of the screen 111 of the electronic device 104 for user operation, wherein the input received through user engagement of the graphic user interface of the screen includes a selection of one pre-programmed message 126b in a list 126c of pre-programmed messages 126b to be displayed as a textual message on the emissive display 106 of the driver courtesy housing 102.

In some embodiments, the at least one program 200 stored on the memory 118 of the electronic device 104 for user operation further includes the steps of receiving 230, by a cellular transmitter/receiver 124a, a communication packet including a visual content 128, wherein the visual content is capable of displaying static images, videos, animations, or any combination thereof, and displaying the visual content on the emissive display 106, wherein the visual content 128 is displayed in a subservient position to the textual message 126, if a textual message is displayed on the emissive display 106.

In some embodiments, the means 122 for transmitting and receiving data packets in the at least one communication module 120 of the electronic device 104 for user operation is a Bluetooth module 122b and the means 124 for transmitting and receiving data packets in the at least one communication module 112 of the driver courtesy housing 102 is a Bluetooth module 124b.

In some embodiments, at least one communication module 112 is coupled to the control module 110 in the driver courtesy housing 102, and includes a cellular transmitter/receiver 124a.

In some embodiments, the visual content is an advertisement pushed to the emissive display 106 from a remote device, such as a smartphone 104a.

In some embodiments, the textual message 126 is received from a cellularly transmitted communication packet received by the cellular transmitter/receiver 124a.

While there has been shown and described above the preferred embodiment of the instant invention it is to be appreciated that the invention may be embodied otherwise than is herein specifically shown and described and that certain changes may be made in the form and arrangement of the parts without departing from the underlying ideas or principles of this invention as set forth in the Claims appended herewith.

I claim:
1. An electronic driver courtesy system, comprising:
a driver courtesy housing, wherein said driver courtesy housing is coupled to a vehicle and positioned to be viewable to an outside audience;
said driver courtesy housing containing at least an emissive display, a power source, a control module coupled to said emissive display, and at least one communication module coupled to said control module;
an electronic device for user operation, said electronic device having a screen displaying a graphic user interface, at least one microphone, a processor, a memory, and at least one communication module capable of selectively pairing with said communication module in said driver courtesy housing, whereby said communication module of said electronic device for user operation includes a means for transmitting and receiving data packets to and from said communication module coupled to said control module of said driver courtesy housing, and said communication module of said driver courtesy housing includes a means for transmitting and receiving data packets to and from said electronic device for user operation; and wherein said memory of said electronic device for user operation includes at least one program stored thereon that, when executed by said processor, performs the steps of:
- initiating a connection between said communication module of said electronic device for user operation and said communication module in said driver courtesy housing;
- receiving a voice command by said at least one microphone of said electronic device for user operation, wherein said voice command includes a message to be displayed as a textual message on said emissive display of said driver courtesy housing;
- displaying said textual message to be displayed on said emissive display of said driver courtesy housing on the screen of said electronic device for user operation;
- transmitting a data packet containing said textual message to be displayed on said emissive display of said driver courtesy housing to said communication module coupled to said control module of said driver courtesy housing;
- receiving said data packet containing said textual message to be displayed on said emissive display by said communication module coupled to said control module of said driver courtesy housing;
- processing said data packet containing said textual message to be displayed on said emissive display of said driver courtesy housing, wherein the data packet is processed by said control module;
- displaying on said emissive display of said driver courtesy housing, said textual message, received from said electronic device for user operation; and
- removing said textual message from said emissive display upon receiving a communication prompting removal of said textual message from said emissive display.

2. The electronic driver courtesy system, as recited in claim 1, wherein said at least one program stored on the memory of said electronic device for user operation further includes the step of:
- receiving an input received through user engagement of said graphic user interface of said screen of said electronic device for user operation, wherein said input received through user engagement of said graphic user interface of said screen includes a typed message to be displayed as a textual message on said emissive display of said driver courtesy housing.

3. The electronic driver courtesy system, as recited in claim 1, wherein said at least one program stored on the memory of said electronic device for user operation further includes the step of:
- receiving an input received through user engagement of said graphic user interface of said screen of said electronic device for user operation, wherein said input received through user engagement of said graphic user interface of said screen includes a selection of one pre-programmed message in a list of pre-programmed messages to be displayed as a textual message on said emissive display of said driver courtesy housing.

4. The electronic driver courtesy system, as recited in claim 1, wherein said step of receiving a voice command by said at least one microphone of said electronic device for user operation, includes a sub-step of filtering said textual messages for predesignated inappropriate messages by comparing said textual message received to a stored list of black-listed messages and keywords, including variations of those messages and keywords, whereby once detected, said filter terminates transmission of said textual message to said communication module in said driver courtesy housing.

5. The electronic driver courtesy system, as recited in claim 4, wherein at least one communication module coupled to said control module in said driver courtesy housing includes a cellular transmitter and receiver.

6. The electronic driver courtesy system, as recited in claim 5, wherein said at least one program stored on said memory of said electronic device for user operation includes, further includes the step of:
- receiving, by a cellular receiver, a communication packet including a visual content, wherein said visual content is capable of displaying static images, videos, animations, or any combination thereof; and
- displaying said visual content on said emissive display, wherein said visual content is displayed in a subservient position to said textual message, if a textual message is displayed on said emissive display.

7. The electronic driver courtesy system, as recited in claim 6, wherein said visual content is an advertisement pushed to said emissive display from a remote device.

8. The electronic driver courtesy system, as recited in claim 6, wherein said textual message is received from a cellularly transmitted communication packet received by said cellular receiver.

9. The electronic driver courtesy system, as recited in claim 1, wherein said power source is a rechargeable battery.

10. The electronic driver courtesy system, as recited in claim 1, wherein said power source includes a solar panel.

11. The electronic driver courtesy system, as recited in claim 1, wherein said means for transmitting and receiving data packets in said communication module of said electronic device for user operation is a Bluetooth module and said means for transmitting and receiving data packets in said communication module of said driver courtesy housing is a Bluetooth module.

12. The electronic driver courtesy system, as recited in claim 1, wherein said driver courtesy housing includes a camera mounted thereon and coupled to said control module.

13. An electronic driver courtesy, comprising:
- a driver courtesy housing, wherein said driver courtesy housing is coupled to a vehicle and positioned to be viewable to an outside audience;
- said driver courtesy housing containing at least an emissive display, a power source, a control module coupled to said emissive display, and at least one communication module coupled to said control module;
- an electronic device for user operation, said electronic device having a screen displaying a graphic user interface, at least one microphone, a processor, a memory, and at least one communication module capable of selectively pairing with said communication module in said driver courtesy housing, whereby said communication module of said electronic device for user operation includes a means for transmitting and receiving data packets to and from said communication module coupled to said control module of said driver courtesy housing, and said communication module of said driver courtesy housing includes a means for transmitting and receiving data packets to and from said electronic device for user operation;
- a mounting bracket connectable to the vehicle having a plurality of connection points and a structural skeletal frame;

at least one emissive display securement bracket coupling the emissive display to the mounting bracket;

a plurality of channel brackets mounted to said mounting bracket and positioned around a circumference of the emissive display, whereby said channel brackets house electronic components, including an electronics housing, containing at least one communication module and at least one control module;

a housing frame mounting to and covering said plurality of channel brackets; and said housing frame having said solar panels embedded within its outer surfaces and a power port integrated therewith.

14. An electronic driver courtesy system, comprising:

a driver courtesy housing, wherein said driver courtesy housing is coupled to a vehicle and positioned to be viewable to an outside audience;

said driver courtesy housing containing at least an emissive display, a power source, a control module coupled to said emissive display, and at least one communication module coupled to said control module;

an electronic device for user operation, said electronic device having a screen displaying a graphic user interface, at least one microphone, a processor, a memory, and at least one communication module capable of selectively pairing with said at least one communication module in said driver courtesy housing, whereby said at least one communication module of said electronic device for user operation includes a means for transmitting and receiving data packets to and from said at least one communication module coupled to said control module of said driver courtesy housing, and said at least one communication module of said driver courtesy housing includes a means for transmitting and receiving data packets to and from said electronic device for user operation; and said memory of said electronic device for user operation includes at least one program stored thereon that, when executed by said processor, performs the steps of:
  initiating a connection between said at least one communication module of said electronic device for user operation and said at least one communication module in said driver courtesy housing;
  receiving at least one of:
    (i) a voice command by said at least one microphone of said electronic device for user operation, wherein said voice command includes a message to be displayed as a textual message on said emissive display of said driver courtesy housing;
    (ii) an input received through user engagement of said graphic user interface of said screen of said electronic device for user operation, wherein said input received through user engagement of said graphic user interface of said screen includes a typed message to be displayed as a textual message on said emissive display of said driver courtesy housing; and
    (iii) an input received through user engagement of said graphic user interface of said screen of said electronic device for user operation, wherein said input received through user engagement of said graphic user interface of said screen includes a selection of one pre-programmed message in a list of pre-programmed messages to be displayed as a textual message on said emissive display of said driver courtesy housing;
  displaying a received textual message to be displayed on said emissive display of said driver courtesy housing on the screen of said electronic device for user operation;
  transmitting a data packet containing said received textual message to be displayed on said emissive display of said driver courtesy housing to said at least one communication module coupled to said control module of said driver courtesy housing;
  receiving said data packet containing said received textual message to be displayed on said emissive display by said at least one communication module coupled to said control module of said driver courtesy housing;
  processing said data packet containing said received textual message to be displayed on said emissive display of said driver courtesy housing by said control module;
  displaying on said emissive display of said driver courtesy housing, said received textual message, received from said electronic device for user operation; and
  removing said received textual message from said emissive display upon receiving a communication prompting removal of said received textual message from said emissive display.

15. The electronic driver courtesy system, as recited in claim 14, wherein said means for transmitting and receiving data packets in said at least one communication module of said electronic device for user operation is a Bluetooth module and said means for transmitting and receiving data packets in said at least one communication module of said driver courtesy housing is a Bluetooth module.

16. The electronic driver courtesy system, as recited in claim 14, wherein at least one communication module coupled to said control module in said driver courtesy housing includes a cellular transmitter and receiver.

17. The electronic driver courtesy system, as recited in claim 16, wherein said at least one program stored on said memory of said electronic device for user operation further includes the steps of:
  receiving, by a cellular receiver, a communication packet including a visual content, wherein said visual content is capable of displaying static images, videos, animations, or combination thereof; and
  displaying said visual content on said emissive display, wherein said visual content is displayed in a subservient position to said textual message, if a textual message is displayed on said emissive display.

18. The electronic driver courtesy system, as recited in claim 17, wherein said visual content is an advertisement pushed to said emissive display from a remote device.

19. The electronic driver courtesy system, as recited in claim 17, wherein said textual message is received from a cellularly transmitted communication packet received by said cellular receiver.

20. The electronic driver courtesy system, as recited in claim 14, wherein the driver courtesy housing comprises:
  a mounting bracket connectable to the vehicle having a plurality of connection points and a structural skeletal frame;
  at least one emissive display securement bracket coupling the emissive display to the mounting bracket;
  a plurality of channel brackets mounted to said mounting bracket and positioned around a circumference of the emissive display, whereby said channel brackets house electronic components, including an electronics housing, containing at least one communication module and at least one control module;

a housing frame mounting to and covering said plurality of channel brackets; and said housing frame having said solar panels embedded within its outer surfaces and a power port integrated therewith.

* * * * *